(12) United States Patent
Drewry et al.

(10) Patent No.: US 8,041,020 B2
(45) Date of Patent: Oct. 18, 2011

(54) SYSTEM AND METHOD FOR ACTIVE MOBILE COLLABORATION

(75) Inventors: John S. Drewry, San Jose, CA (US);
Michael A. White, San Jose, CA (US);
Steven D. Schramm, San Jose, CA (US); Saurav Chatterjee, San Jose, CA (US); Paul R. Fulton, San Jose, CA (US); Andre M. Nakaso, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1464 days.

(21) Appl. No.: 10/890,922

(22) Filed: Jul. 14, 2004

(65) Prior Publication Data

US 2005/0041793 A1    Feb. 24, 2005

Related U.S. Application Data

(60) Provisional application No. 60/487,143, filed on Jul. 14, 2003.

(51) Int. Cl.
*H04M 3/42* (2006.01)

(52) U.S. Cl. ......... 379/211.01; 379/201.01; 379/201.02; 379/211.02; 455/414.1; 455/417; 455/445

(58) Field of Classification Search ............... 379/88.17, 379/211.01, 201.01, 201.02, 211.02; 455/414.1, 455/417, 445
See application file for complete search history.

(56) References Cited

U.S. PATENT DOCUMENTS

| 5,329,578 | A | * | 7/1994 | Brennan et al. | .......... 379/211.03 |
| 6,404,860 | B1 | * | 6/2002 | Casellini | .................... 379/88.17 |
| 2002/0055351 | A1 | * | 5/2002 | Elsey et al. | ................... 455/414 |
| 2002/0064260 | A1 | * | 5/2002 | Longman et al. | ........ 379/106.02 |
| 2002/0116461 | A1 | * | 8/2002 | Diacakis et al. | .............. 709/204 |
| 2003/0087665 | A1 | * | 5/2003 | Tokkonen | ..................... 455/556 |

OTHER PUBLICATIONS

PCT International Search Report, International Application No. PCT/US2006/033181, Apr. 25, 2007.
Written opinion of the International Searching Authority for Application No. PCT/US2006/033181.
PCT International Search Report, International Application No. PCT/US2006/033071, Apr. 20, 2007.
PCT International Search Report, International Application No. PCT/US2007/000487, Oct. 18, 2007.
PCT International Search Report, International Application No. PCT/US2007/007064, Jun. 30, 2008.

\* cited by examiner

*Primary Examiner* — Ahmad F Matar
*Assistant Examiner* — Khai N Nguyen
(74) *Attorney, Agent, or Firm* — Tucker Ellis & West LLP

(57) ABSTRACT

A communication system is provided that uses loosely-coupled client-server architectures to improve the efficiency of communications. The communication system includes client and facilitator applications. The client application is a component of processor-based mobile communication devices. The facilitator application is hosted on one or more servers or other processor-based devices, and communicates with the client application via one or more couplings. The facilitator application can also be distributed among one or more portable processor-based devices including the communication devices hosting the client application. The communication system improves efficiency of voice communications by allowing communication device users to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones.

57 Claims, 34 Drawing Sheets

| | |
|---|---|
| Alert ID | Failed to Deliver Alert Message (OS-1a) |
| Purpose | Notifies originator that their message could not be delivered due to a network communications problem somewhere between the originator's handset and the recipient's handset(s). |
| Type | Notification |
| Originator | Client |
| Display Text | N/A |
| Priority | Normal |
| Text subject | AMC generated message |
| Voice subject | N/A |
| Expiration | 12 hours |
| Originator Actions | 1. Delete<br>2. Send again |

FIG.10

| Alert ID | AC-1a |
|---|---|
| Purpose | Notifies receiver of Active Call request. |
| Type | Request |
| Originator | End User, Caller |
| Originator's phone no. | Caller defined at UI. Default is Caller's handset phone number |
| Display Text | N/A |
| Priority | Caller defined at UI |
| Text subject | Caller defined at UI |
| Voice subject | Caller defined at UI |
| Expiration | Caller defined at UI as [HH:MM, or wall clock time]. Default is 180 minutes |
| Response Options | 1. Accept call request with recipient's handset phone number (this is the default response)<br>2. Accept call request with phone number input by recipient<br>3. Initiate mobile call to originator using the value in the originator's phone number field<br>4. Postpone<br>   a. 15 minutes<br>   b. 60 minutes<br>   c. User defined interval<br>   d. User defined wall clock time<br>5. Respond with predefined text message<br>6. Initiate a Voice IM to originator<br>7. Delete |

FIG.12

| Alert ID | AC-1b |
|---|---|
| Purpose | Informs caller that recipient has accepted his Active Call request. |
| Type | Response |
| Originator | End User, Recipient |
| Display Text | N/A |
| Priority | N/A |
| Text subject | AMC generated message: "<recipient's name> accepted your call request at <time recipient responded>". |
| Voice subject | N/A |
| Expiration | Expiration time of associated AC-1a message. |
| Recipient's number | Phone number provided by AC-1a recipient |
| Response Options | 1. Initiate mobile call (using the value in the recipient's number field)<br>2. Delete |

FIG.13

| Case: AC-2 | Active Call, receiver requests postponement | |
|---|---|---|
| Description: Active call flow where receiver desires to postpone the call until a later time. | | |
| Assumptions: 1. AMC to AMC calling. | | |
| Originator | Facilitator | Recipient |
| Selects contact, initiates call request<br><br>■ Send request to facilitator<br>○ Failed to deliver request | Server processes request<br><br>■ Deliver request to receiver<br>○ Failed to deliver request. | Received alert<br>AC-1a<br><br>■ Postpones request, selects postponement period<br>○ Accepts request... AC-1b<br>○ Initiates mobile call<br>○ Request expires<br>○ Failed to deliver response |
| Receives Alert<br>AC-2a<br><br>■ Accepts postponement request<br>○ Request expires - effectively he's rejected the postponement<br>○ Failed to deliver response to server | Server processes response<br><br>■ Deliver response to originator<br>○ Failed to deliver response | |
| | Server monitors period, sends an alert to originator when time is up depending on availability state of receiver. | |
| Receives Alert<br>AC-2b<br><br>■ Initiates mobile call<br>○ Send Active call request again<br>○ Ignores or deletes request. | If receiver is available:<br>■ Deliver AC-2b to originator<br><br>OR<br><br>If receiver is not available:<br>■ Deliver AC-2c to originator | |
| Receives Alert<br>AC-2c<br><br>■ Initiates mobile call<br>○ Send Active Call request again<br>○ Initiate "Camp On" with receiver.<br>○ Ignores or deletes request. | | |

FIG.14

| | |
|---|---|
| Alert ID | AC-2a |
| Purpose | Informs caller that recipient has requested to postpone Active Call request. Requested postponement time is included in the text subject for this alert. |
| Type | Response |
| Originator | End User, Recipient |
| Display Text | N/A |
| Priority | N/A |
| Text subject | AMC generated message: "<recipient name> has requested to postpone your call until <wall clock time>. AMC will remind you at that time". Where wall clock time is defined as the time recipient responded plus the postponement period. |
| Voice subject | N/A |
| Expiration | The same time as the postponement time (ie. the wall clock time when the recipient of AC-1a responded plus the requested postponement period). |
| Response Options | 1. Accept postponement<br>2. Delete |

FIG.15

| | |
|---|---|
| Alert ID | AC-2b |
| Purpose | Informs caller that the previously scheduled postponement time has been reached and it's time to call |
| Type | Notification |
| Originator | AMC facilitator |
| Display Text | N/A |
| Priority | N/A |
| Text subject | AMC generated message: The postponement period requested by "<original Active Call recipient's name> has lapsed. It is now time to place your call." |
| Voice subject | N/A |
| Phone number | Mobile phone number of AC-1a recipient who requested the postponement. |
| Expiration | 30 minutes |
| Response Options | 1. Initiate mobile call (using phone number field value)<br>2. Send (active call request) again<br>3. Delete |

FIG.16

| | |
|---|---|
| Alert ID | AC-2c |
| Purpose | Informs caller that the previously scheduled postponement time has been reached but the recipient is now unavailable |
| Type | Notification |
| Originator | AMC facilitator |
| Display Text | N/A |
| Priority | N/A |
| Text subject | AMC generated message: The postponement period requested by "<original Active Call recipient's name> has lapsed but the receiver is currently not available to talk. |
| Voice subject | N/A |
| Phone number | Mobile phone number of AC-1a recipient who requested the postponement. |
| Expiration | 30 minutes |
| Response Options | 1. Initiate mobile call (using phone number field value)<br>2. Send (active call request) again<br>3. Initiate "camp on" to AC-1a recipient<br>4. Delete |

FIG.17

| | |
|---|---|
| Alert ID | AC-3a |
| Purpose | Informs subscriber that their availability state is being watched by another subscriber. |
| Type | Notification |
| Originator | Originator of Active Call request |
| Display Text | N/A |
| Priority | N/A |
| Text subject | N/A |
| Voice subject | N/A |
| Expiration | 15 minutes<br>NOTE: this is the expiration for AC-3a, not the "camp on" request. |
| Phone number | The phone number provided by the initiating subscriber. |
| Response Options | 1. Initiate mobile call (using number in AC-3a)<br>2. Delete |

FIG.19

| Alert ID | AC-3b |
|---|---|
| Purpose | Informs caller that the requested subscriber is now available. |
| Type | Notification |
| Originator | AMC facilitator |
| Display Text | N/A |
| Priority | N/A |
| Text subject | AMC generated message: <recipient name> is now available to received calls. |
| Voice subject | N/A |
| Expiration | 30 minutes |
| Response Options | 1. Initiate mobile call (using number associated with alert)<br>2. Initiate Active call request<br>3. Delete |

FIG.20

| Case: VM-1 | Voice Instant Message, PA mode enabled |
|---|---|
| Description: Voice IM flow where recipient has Public Address communications mode enabled through the active AMC availability profile. In this case the voice message is played over the handset speaker immediately. | |
| Assumptions: 1. AMC to AMC calling. | |

| Originator | Facilitator | Recipient |
|---|---|---|
| Selects one or more contacts, initiates Voice IM<br><br>■ Send Voice IM to server<br>○ Failed to deliver request | Server processes request<br><br>■ Deliver Voice IM to receiver(s)<br>○ Failed to deliver request | Receive Alert VM-1a. Handset client checks active communications mode.<br><br>■ PA mode enabled<br>-sound Voice IM audible<br>-play message over speaker<br>-PA mode not enabled... VM-2<br>○ Initiate mobile call to caller<br>○ Initiate Voice IM to caller<br>○ Request expires before user listens to Voice IM |

FIG.21

| Alert ID | VM-1a |
|---|---|
| Purpose | Informs receiver they've received a Voice IM |
| Type | Notification |
| Originator | End User |
| Display Text | N/A |
| Priority | Caller defined at UI. |
| Text subject | N/A |
| Voice subject | N/A |
| Voice IM | Used only when PA mode is enabled. |
| Audible | Default is one beep. |
| Expiration | Caller defined at UI as [HH:MM] not to exceed 48 hours. Default is 3 hours. |
| Phone number | Caller defined at UI. Default is originator's mobile handset phone number. |
| Response Options | 1. Initiate mobile call (to value in the phone number field) 2. Initiate Voice IM to caller 3. Delete |

FIG.22

| Case: VM-2 | Voice Instant Message, PA mode not enabled | | |
|---|---|---|---|
| Description: Voice IM flow where recipient does not have Public Address communications mode enabled through the active AMC availability profile. In this case the voice message is not played over the speaker. The user shall use the handset earpiece to listen. | | | |
| Assumptions: 1. AMC to AMC calling. | | | |
| Originator | Facilitator | | Recipient |
| Selects one or more contacts, initiates Voice IM ■ Send Voice IM to server ○ Failed to deliver request | Server processes request ■ Deliver Voice IM to receiver(s) ○ Failed to deliver request | | Receive Alert VM-1a. Handset client checks active communications mode. ■ PA mode not enabled ○ PA mode enabled... VM-1 ○ Initiate mobile call to caller ○ Initiate Voice IM to caller ○ Request expires before user listens to Voice IM |

FIG.23

| | |
|---|---|
| Alert ID | NO-1a |
| Purpose | Notification of missed call from non-AMC caller. |
| Type | Notification |
| Originator | Facilitator |
| Display Text | N/A |
| Priority | N/A |
| Text subject | AMC generated message: "Missed call from <phone number>." |
| Voice subject | N/A |
| Expiration | 180 minutes |
| Phone number | Phone number of missed call. |
| Response Options | 1. Initiate mobile call (to value in the phone number field)<br>2. Add phone number to AMC Phone Book<br>3. Reply with text message (NO-1b)<br>4. Delete |

FIG.24

| | |
|---|---|
| Alert ID | NO-1b |
| Purpose | Provides a means to respond to NO-1a (a missed call from a non-AMC caller). This is considered a request placed against the Facilitator. |
| Type | Request |
| Originator | AMC subscriber |
| Display Text | N/A |
| Priority | N/A |
| Text subject | Caller defined at UI. |
| Voice subject | N/A |
| Expiration | Default is 60 minutes.<br>Not changeable by end user. |
| Missed call phone number | Phone number of missed non-AMC caller.<br>SMS will be directed at this number . |
| AMC phone number | Caller defined at UI.<br>Default is subscriber's mobile handset phone number. |
| Response Options | N/A |

FIG.25

| Alert ID | ON-1a |
|---|---|
| Purpose | Active call request to a non-AMC person. |
| Type | Request |
| Originator | AMC subscriber |
| Display Text | N/A |
| Priority | Caller defined at UI |
| Text subject | Caller defined at UI |
| Voice subject | N/A |
| Expiration | Caller defined at UI as [HH:MM] not to exceed 72 hours. Default is 3 hours. |
| Phone number | Caller defined at UI. Default is originator's mobile handset phone number. |
| Response Options | N/A |

FIG.26

SYSTEM AND METHOD FOR ACTIVE MOBILE COLLABORATION

RELATED APPLICATION

This application claims priority from U.S. patent application Ser. No. 60/487,143, filed Jul. 14, 2003.

TECHNICAL FIELD

The disclosure herein relates generally to communication systems. In particular, this disclosure relates to facilitating active call management.

BACKGROUND

Mobile communications in today's real-time enterprise can be challenging. The problem is further complicated by changes in the workplace which have led to a more geographically dispersed and highly mobile workforce. In spite of the popularity of electronic mail (email), large numbers of people and employees still depend upon voice communications to collaborate with colleagues and drive business success. This is especially true for those in sales, service, operations and management roles who rely upon timely access to and coordination with colleagues as well as other employees, customers, partners and suppliers. Thus, voice communications remain an essential means of conducting business and staying in contact.

As a result of communications being so critical to business today, many professionals and enterprise employees now handle very large numbers of voicemails each business day. Managing these large numbers of voicemails and the corresponding call-backs consumes large amounts of time during the typical business day. For the growing number of people who spend a significant part of their day away from their offices or in meetings or other events, managing this large number of calls and messages is highly time-consuming, frustrating and inefficient. Consequently, there is a need for communication systems that provide efficient, timely, and proactive real-time management of voice communications.

BRIEF DESCRIPTION OF THE DRAWINGS

FIG. 10 is a template of the Failed to Deliver alert message (OS-1a), under an embodiment.

FIG. 12 is a template of the Notification of Active Call Request alert message (AC-1a), under an embodiment.

FIG. 13 is a template of the Notification of Active Call Request Acceptance alert message (AC-1b), under an embodiment.

FIG. 14 is a flow diagram for an Active Call in which the recipient requests a postponement, under an embodiment.

FIG. 15 is a template of the Request to Postpone Active Call alert message (AC-2a), under an embodiment.

FIG. 16 is a template of the Notification Postponement Period Complete alert message (AC-2b) (when the recipient is available), under an embodiment.

FIG. 17 is a template of the Notification Postponement Period Complete alert message (AC-2c) (when the recipient is unavailable), under an embodiment.

FIG. 19 is a template of the Notification of Availability State Watching alert message (AC-3a) (when the recipient is unavailable), under an embodiment.

FIG. 20 is a template of the Notification of Availability State Change alert message (AC-3b), under an embodiment.

FIG. 21 is a flow diagram for sending a voice IM to a recipient that is available and has the PA communications mode of a handset enabled (VM-1), under an embodiment.

FIG. 22 is a template of the Notification of Voice IM Request alert message (VM-1a), under an embodiment.

FIG. 23 is a flow diagram for sending a voice IM to a receiver that is available and has the PA communications mode of a handset disabled (VM-2), under an embodiment.

FIG. 24 is a template of the Notification of Missed Call from Non-Subscriber alert message (NO-1a), under an embodiment.

FIG. 25 is a template of the Response to Missed Call from Non-Subscriber alert message (NO-1b), under an embodiment.

FIG. 26 is a template of the Active Call Request to a Non-Subscriber (ON-1a), under an embodiment.

DETAILED DESCRIPTION

A communication system is provided herein that uses loosely-coupled client-server architectures to improve the efficiency of voice communications. The communication system, referred to herein as the active mobile collaboration (AMC) system, includes a client application and a facilitator application. The client application, also referred to as the AMC client, is a component of a variety of processor-based mobile communication devices and telephones. The facilitator application of an embodiment is hosted on one or more servers or other processor-based devices, and communicates with the AMC client via one or more couplings. The facilitator application of alternative embodiments can be distributed among one or more portable processor-based devices including the same communication devices as the client application. The components of the AMC system function to improve efficiency of voice communications by allowing communication device users to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones, to name a few.

In the following description, numerous specific details are introduced to provide a thorough understanding of, and enabling description for, embodiments of the active mobile collaboration system. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
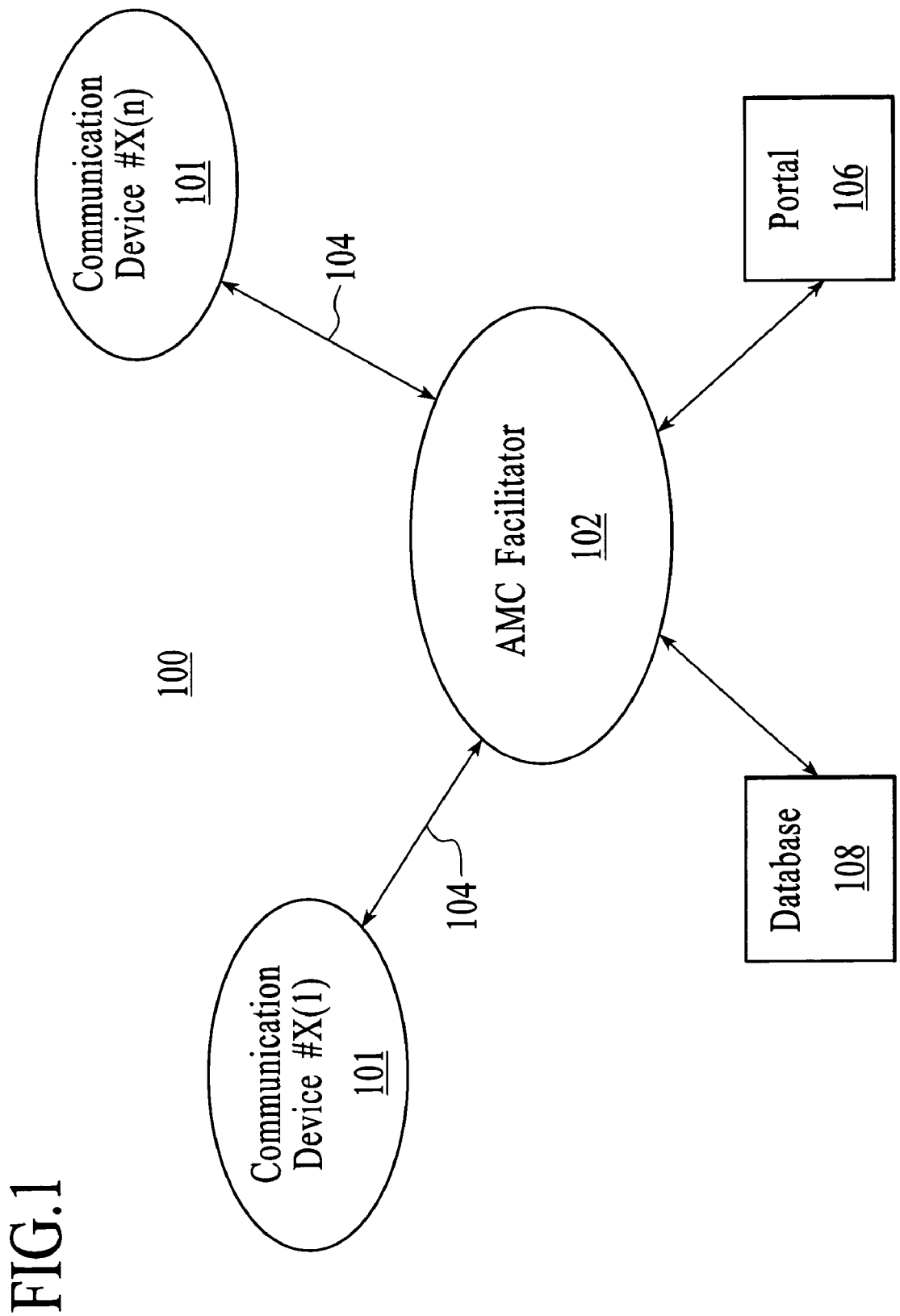
FIG. 1 is a block diagram of an active mobile collaboration (AMC) system, under an embodiment.

FIG. 1 is a block diagram of an active mobile collaboration (AMC) system 100, under an embodiment. The AMC system 100 includes any number X(n) of communication devices 101 coupled for communication via one or more facilitators 102 and one or more couplings 104. One or more of the communication devices 101 include an AMC client application. Likewise, the facilitator 102, also referred to herein as the AMC facilitator 102 or AMC server 102, includes a facilitator application. The AMC client applications and facilitator applications function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones, as described in detail below. The AMC system 100 of an embodiment also includes couplings with one or more portals 106 and/or one or more databases 108, but is not so limited.

The communication devices 101 and facilitators 102 described herein are processor-based components running or hosting numerous applications or programs. As such, the communication devices 101 and facilitators 102 can include one or more processors (not shown) coupled among any number/combination of components (not shown) known in the art, for example buses, controllers, memory devices, and data input/output (I/O) devices, in any number of combinations.

The communication devices 101 described herein include processor-based electronic devices, for example, cellular telephones, personal computers, portable computing devices, portable telephones, portable communication devices, subscriber devices or units, personal digital assistants (PDAs), mobile devices, wireless devices, wireline devices, voice over Internet Protocol (VOIP) devices, a private branch exchange devices, soft clients, and desktop clients to name a few. The communication devices 101, also referred to as handsets, client devices, mobile devices, mobile communication devices, and portable communication devices, can include all such devices and equivalents, and are not limited to the communication devices described above.

The couplings 104 include wired couplings, wireless couplings, and hybrid wired/wireless couplings, but are not so limited. Furthermore, the couplings 104 can include various networks and/or network components (not shown) of a communication service provider or carrier, but are not so limited. The network and corresponding network components, when present in the couplings 104, can be any of a number of network types known in the art including, but not limited to, local area networks (LANs), metropolitan area networks (MANs), wide area networks (WANs), proprietary networks, backend networks, and the Internet.

Figure 2:
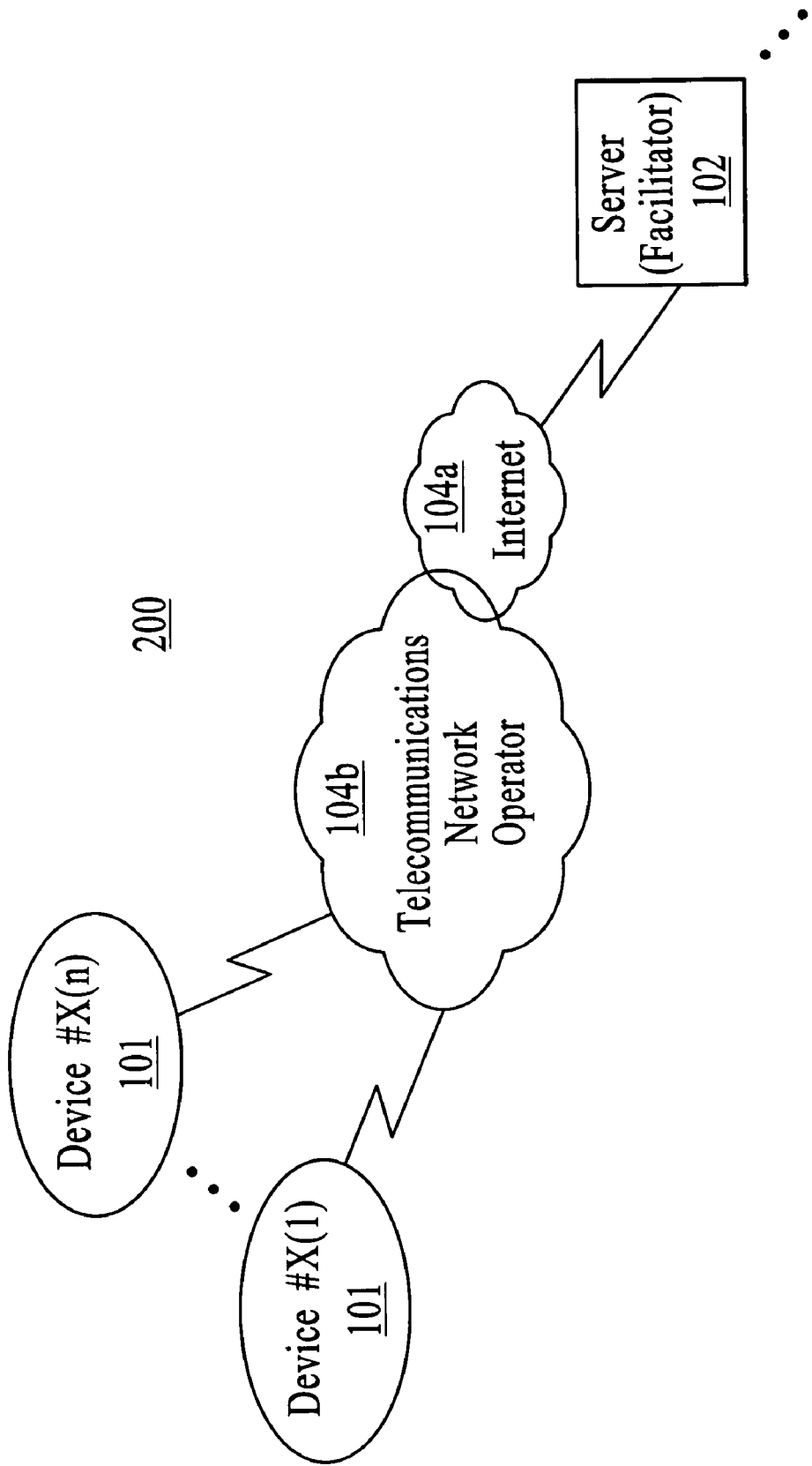
FIG. 2 is a block diagram of an AMC system, under an alternative embodiment.

FIG. 2 is a block diagram of an AMC system 200, under an alternative embodiment. The AMC system 200 includes a server or other processor-based device hosting the facilitator 102. The facilitator 102 communicates with one or more client devices 101 to provide AMC system functions among the client devices 101 via network couplings that include the Internet 104a and a telecommunications network 104b. The telecommunications network 104b includes, for example, a cellular telephone network or a public switched telephone network (PTSN), but can be other voice and data communication networks as known in the art. The cellular telephone network can use communication protocols that include, for example, Global System for Mobile communication (GSM), General Packet Radio Service (GPRS), Code Division Multiple Access (CDMA), and Time Division Multiple Access (TDMA), but are not so limited.

Figure 3:
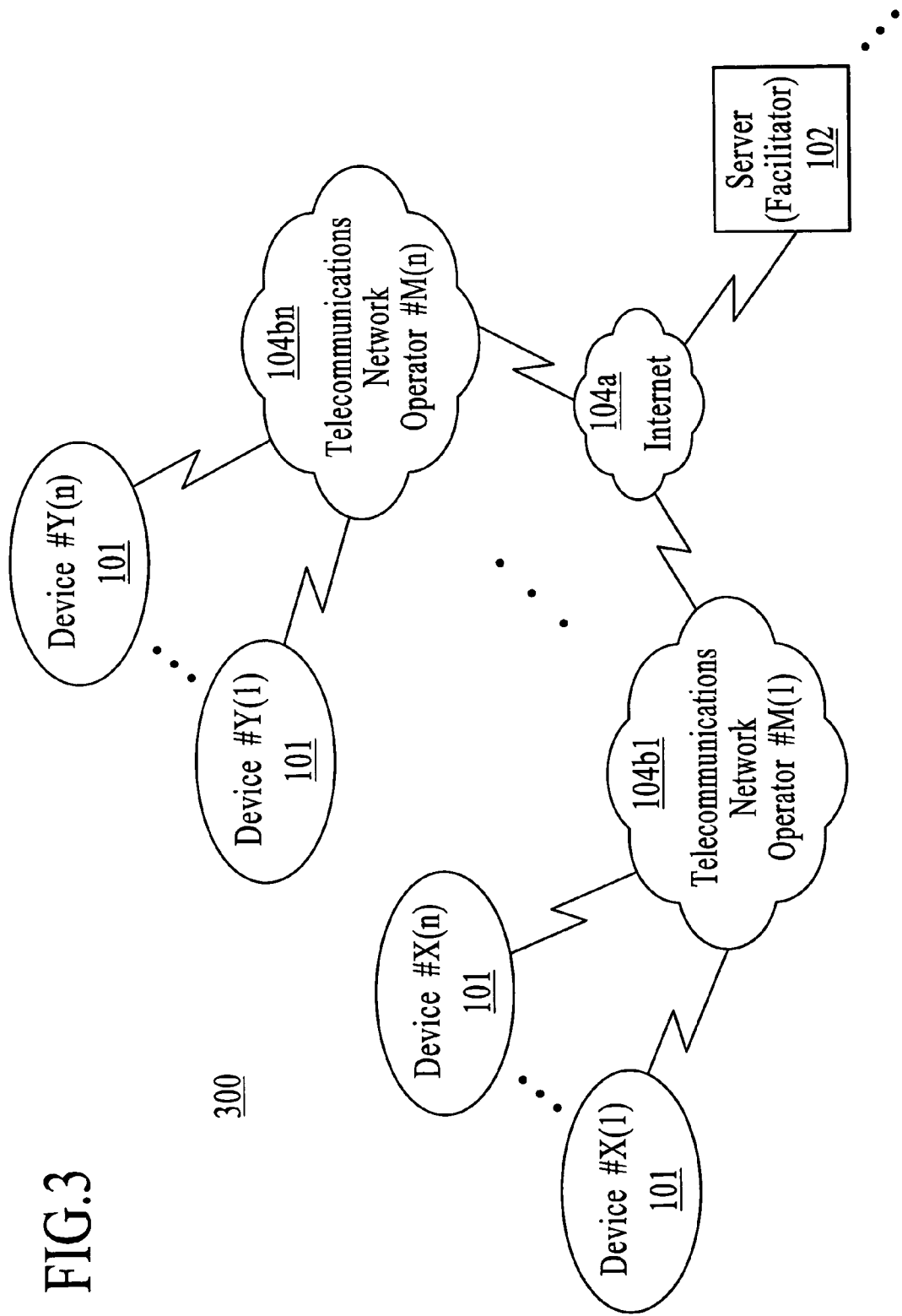
FIG. 3 is a block diagram of an AMC system, under another alternative embodiment.

FIG. 3 is a block diagram of an AMC system 300, under another alternative embodiment. The AMC system 300 includes a server hosting the facilitator 102, and the facilitator 102 communicates with one or more client devices 101 to provide AMC system functions among the client devices 101 via network couplings that include the Internet 104a and/or multiple telecommunications networks 104b1 to 104bn. The telecommunications networks 104b1-104bn are as described above with reference to FIG. 2, but are not so limited.

Figure 4:
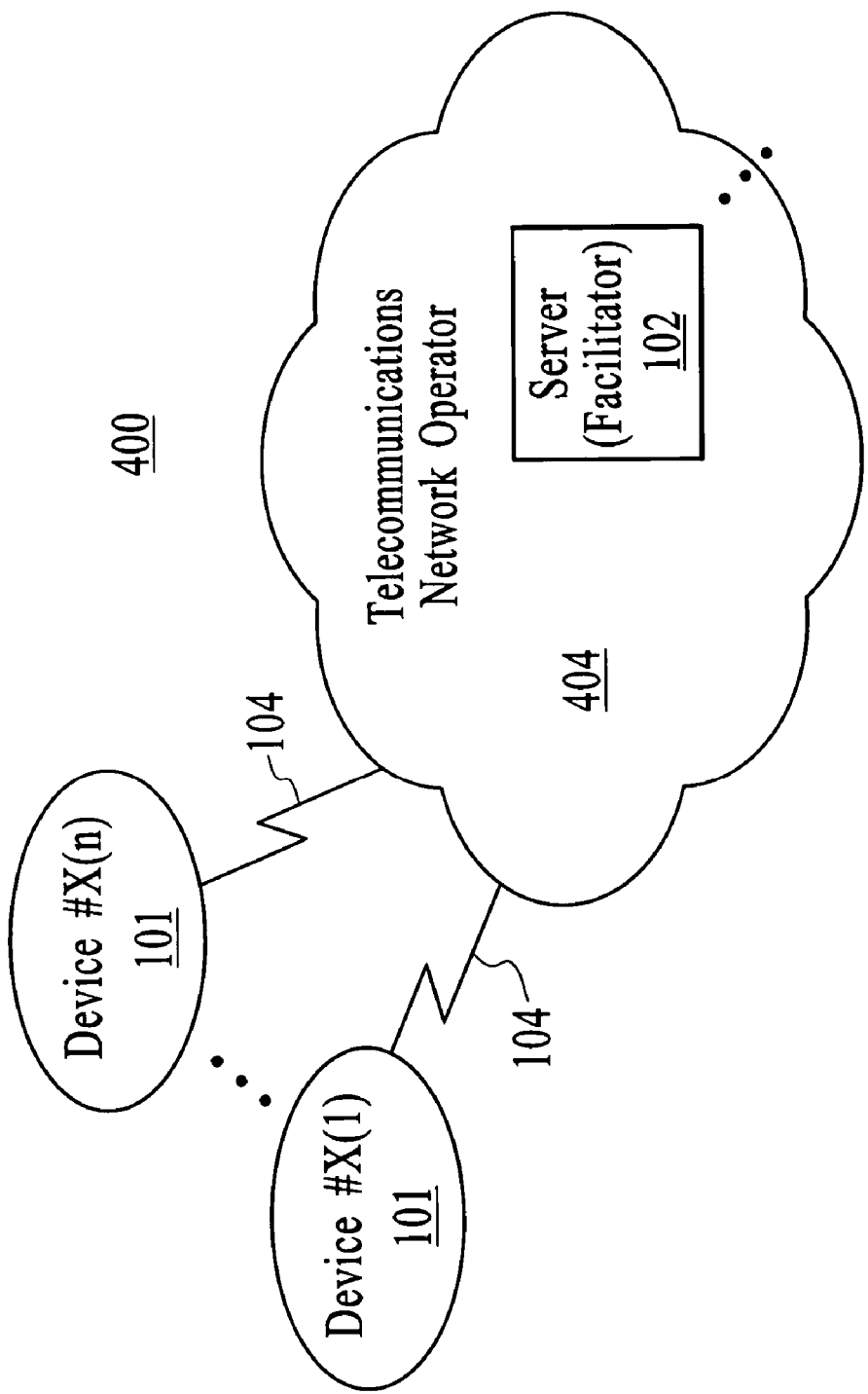
FIG. 4 is a block diagram of an AMC system, under yet another alternative embodiment.

FIG. 4 is a block diagram of an AMC system 400, under yet another alternative embodiment. The AMC system 400 includes a server hosting the facilitator 102, and the server/facilitator 102 is a component of a telecommunications network operator infrastructure. The facilitator 102 communicates with one or more client devices 101 to provide AMC system functions among the client devices 101 via network couplings 104, as described above, but is not so limited.

Figure 5:
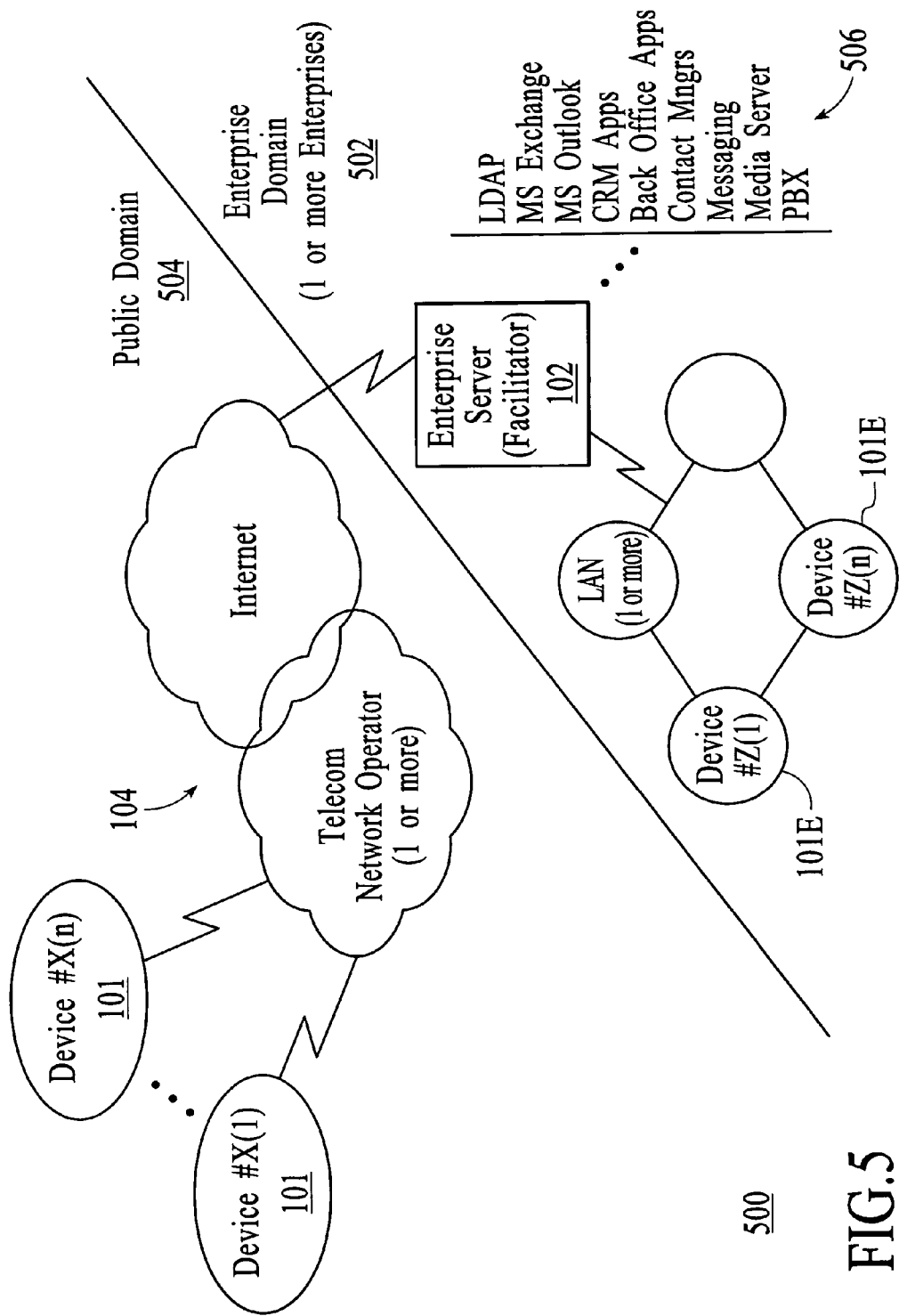
FIG. 5 is a block diagram of an AMC system in an enterprise domain, under another alternative embodiment.

FIG. 5 is a block diagram of an AMC system 500 in an enterprise domain, under another alternative embodiment. The AMC system 500 includes a server hosting the facilitator 102 where the server/facilitator 102 is a component of a corporate or enterprise infrastructure 502. The server can host numerous additional applications 506 in addition to the facilitator 102 or can be dedicated to the facilitator 102. The facilitator 102 communicates with one or more client devices 101 in the public domain 504 to provide AMC system functions among the client devices 101 via network couplings 104. The network couplings 104 include, for example, the Internet and one or more telecommunication service provider infrastructures, but can include any number/type of couplings. The facilitator 102 also communicates with one or more client devices 101E in the enterprise domain 502 to provide AMC system functions among the client devices 101E as described below. The client devices 101E in the enterprise domain 502 are shown coupled to one or more LANs, but are not so limited.

Figure 5A:
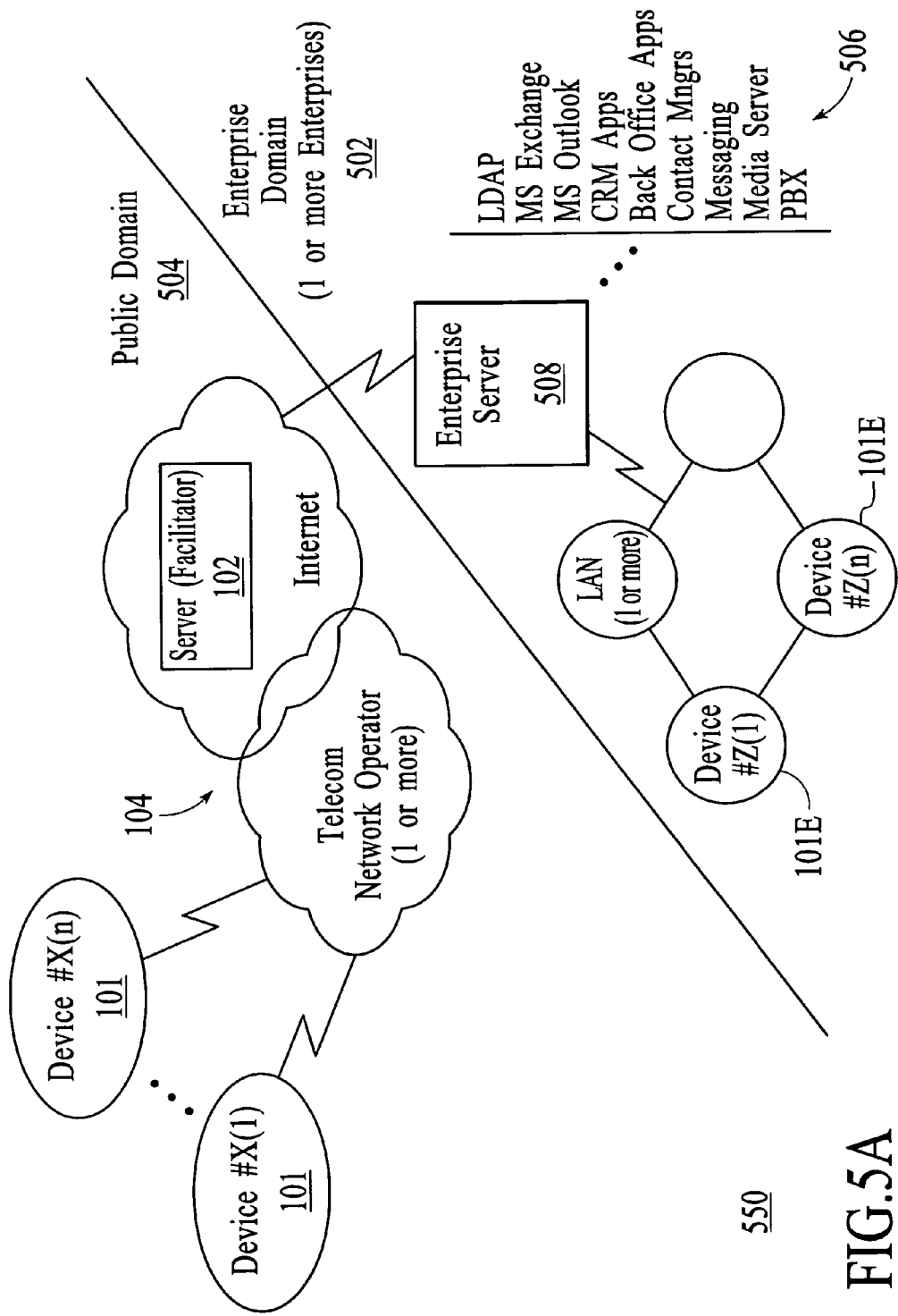
FIG. 5a is a block diagram of an AMC system in a public domain coupled across components of an enterprise domain, under yet another alternative embodiment.

FIG. 5a is a block diagram of an AMC system 550 in a public domain coupled across components of an enterprise domain, under another alternative embodiment. The AMC system 550 includes a server hosting the facilitator 102 where the server/facilitator 102 is a component of a carrier or service provider infrastructure or hosted data center infrastructure for example, but is not so limited. The facilitator 102 communicates with one or more client devices 101 in the public domain 504 to provide AMC system functions among the client devices 101 via network couplings 104. The network couplings 104 include, for example, the Internet and one or more telecommunication service provider infrastructures, but can include any number/type of couplings. The facilitator 102 also communicates with components of the enterprise domain 502 including, for example, one or more client devices 101E, one or more enterprise servers 508, and one or more LANs. The facilitator 102 provides AMC system functions among the client devices 101E as described below. The client devices 101E in the enterprise domain 502 are shown coupled to one or more LANs, but are not so limited.

As an alternative to the couplings of this AMC system 500, the facilitator can be hosted on one or more servers (not shown) of the telecommunications network operator. The facilitator of the telecommunications network operator couples to the enterprise servers via local contact servers (not shown) and/or Virtual Private Network (VPN) couplings, but is not so limited.

Figure 6:
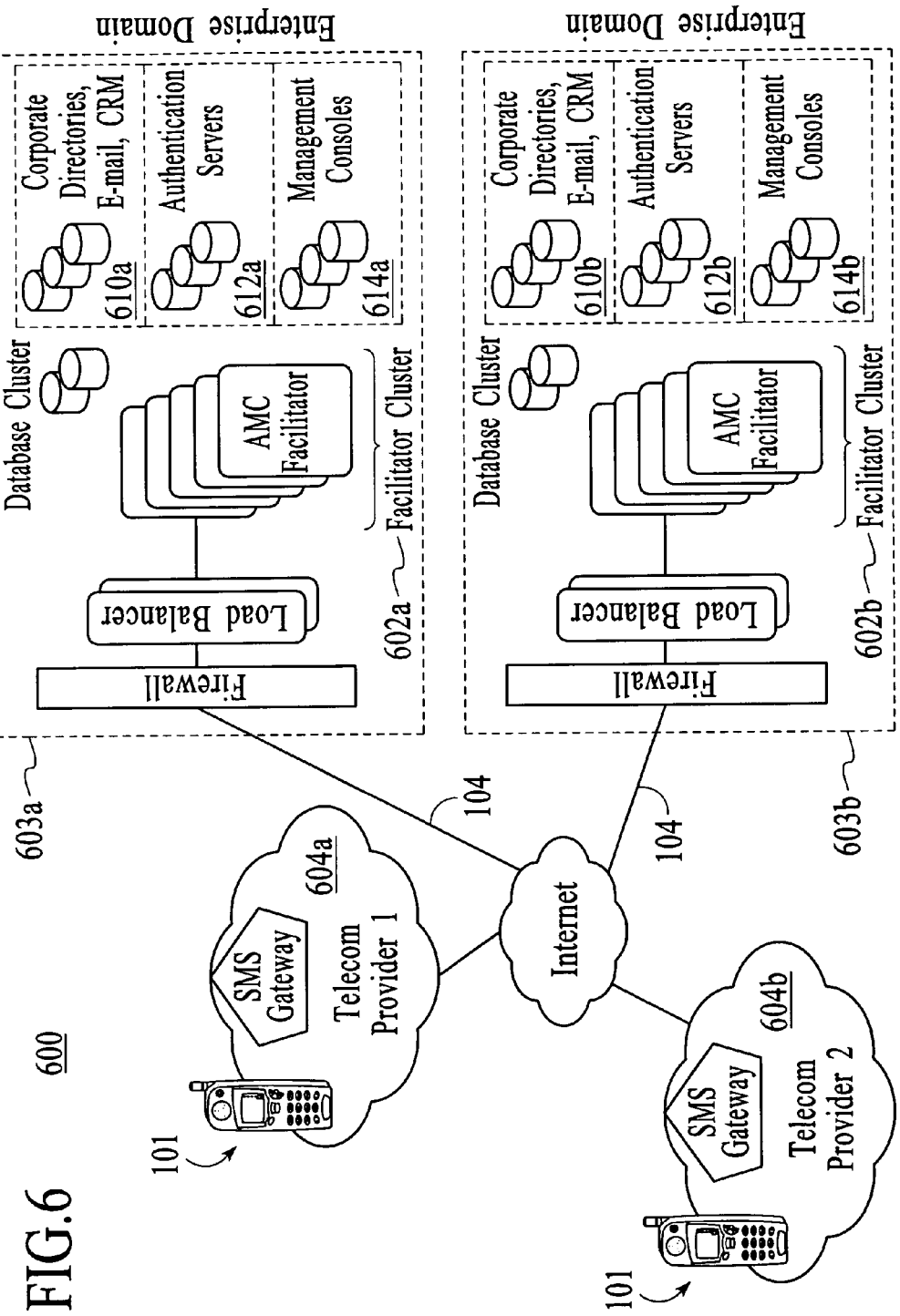
FIG. 6 is a block diagram of an AMC system in an enterprise domain, under still another alternative embodiment.

FIG. 6 is a block diagram of an AMC system 600 in an enterprise domain, under still another alternative embodiment. The AMC system 600 includes one or more facilitators that form facilitator clusters 602a and 602b within each of a number of enterprise domains 603a and 603b. Facilitators of the facilitator clusters 602a and 602b communicate with one or more client devices 101 to provide AMC system functions among the client devices 101 via network couplings 104. The network couplings 104 include, for example, at least one of the Internet and multiple telecommunication service providers 604a and 604b, but can include any number/type of couplings. The facilitators also couple with at least one of corporate directory servers and/or electronic mail (email) servers 610a/610b, authentication servers 612a/612b, and management consoles 614a/614b of the enterprise domains 603a/603b, but are not so limited.

Figure 7:
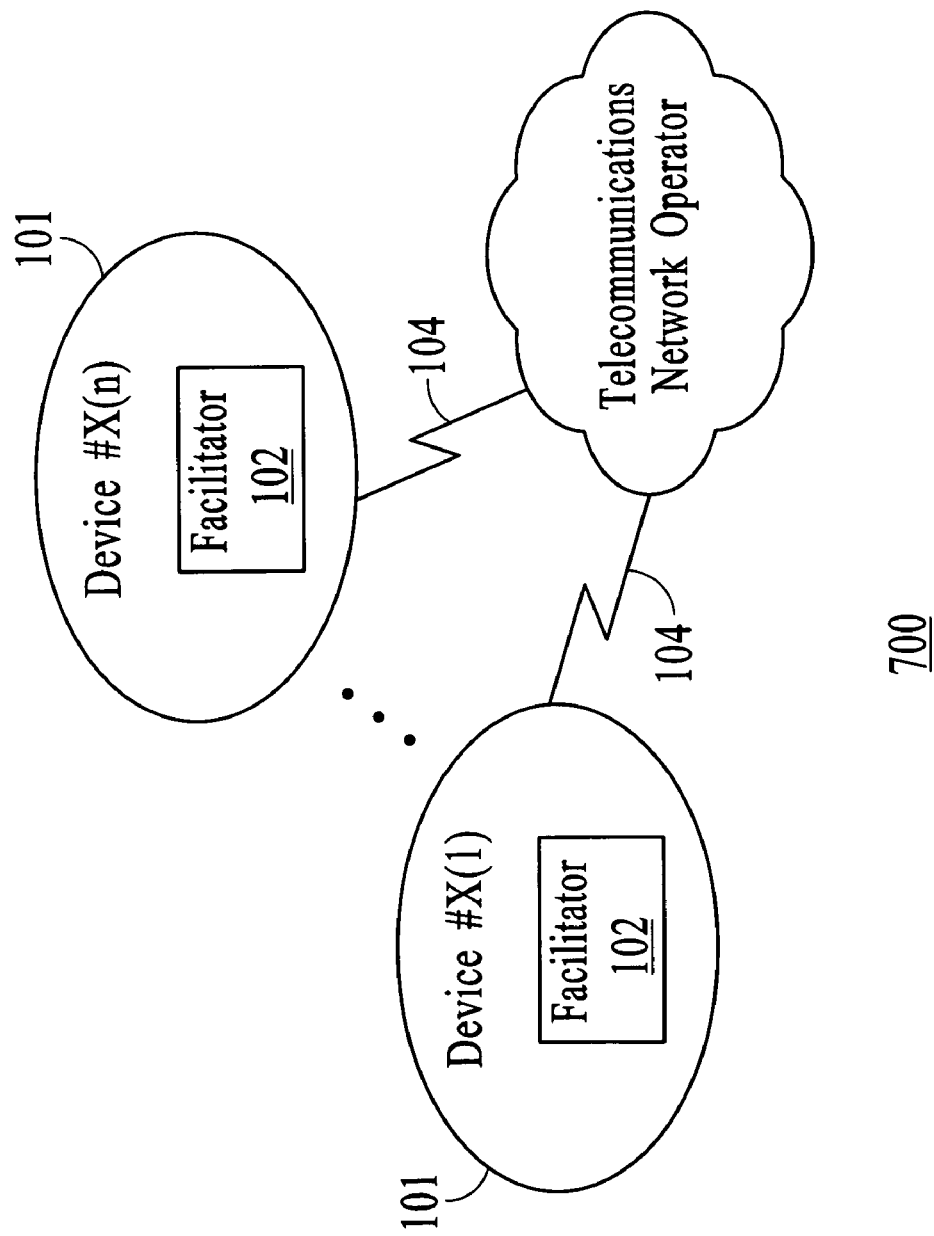
FIG. 7 is a block diagram of an AMC system, under an embodiment.

FIG. 7 is a block diagram of an active mobile collaboration (AMC) system 700, under an embodiment. The AMC system 700 includes any number X(n) of communication devices 101 coupled for communication via one or more facilitators 102 and one or more couplings 104. One or more of the communication devices 101 include an AMC client application. Additionally, one or more of the communication devices 101 include the facilitator 102. The AMC client applications and facilitator applications function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones, as described in detail below.

The AMC system components including the facilitator and AMC client described above function to allow users of the client devices or handsets like cellular telephones to quickly coordinate conversations, screen unwanted calls and interruptions and access enterprise directories. Specifically, the AMC system components increase call success rates by dynamically managing how and when mobile calls take place, let users intelligently screen calls based on caller identity, urgency and subject matter, quickly show which contacts are available to talk and which contacts choose not to be disturbed, reduce interruptions while encouraging urgently needed call-backs, and increase accessibility of enterprise and personal contact information from mobile phones.

An example user scenario follows to show some of the functionality of the AMC system. In this example Bob is a sales representative for CompanyA, a company headquartered in Lansing, Mich. Bob is attending his industry's largest trade show in Atlanta, Ga. when Jane, the primary contact at one of Bob's top customer accounts, approaches him to discuss an outstanding bid for fabrication equipment valued at over five million dollars in revenue. Jane's company just won a lucrative contract, and plans to expand its manufacturing capacity significantly during the coming year. Bob knows that Jane prefers to work exclusively with one vendor during this expansion. This morning, Jane has raised a few technical questions about CompanyA's product line, and needs Bob to get him some detailed answers by the end of the day. Bob could try to answer the questions himself, but prefers to have Jim, the product manager, provide more thorough responses. However, as usual, Bob is uncertain about his ability to reach Jim in a timely manner.

Using typically available technology, Bob consults his handheld, and calls Jim, the product manager, at his office number. No one answers, and Bob leaves a voicemail message. Having been through this process before, Bob calls the vice president (VP) of Marketing who also does not answer his desk phone, so Bob leaves another voicemail message. Not satisfied, Bob calls the VP again, but this time transfers to the VP's assistant. The assistant picks up, and informs Bob that Jim is visiting a customer in San Diego, and may be difficult to reach. She suggests Bob try Jim on his mobile phone, and provides him the number which Bob scribbles on a piece of scrap paper. Bob calls Jim's mobile phone, is redirected to the voicemail system, and leaves Jim an urgent message explaining the situation and asking him to call back as soon as possible. After nearly an hour of trying multiple people, locations, and numbers, Bob has only succeeded in leaving three voicemail messages and enlisting the aid of one assistant. At this point, Bob has no idea if or when Jim will receive the messages. By now it is mid-afternoon, and Bob steps outside to meet another customer for lunch. Not wanting to be rude, Bob silences his phone during the meeting.

Meanwhile, Jim decides to take a break from the noise and confusion of the shop floor in San Diego. He steps outside to check his voicemail both at the office and on his mobile phone. To his surprise, four messages are waiting for him. After spending ten minutes listening to messages from two different voicemail systems, he discovers that they all say essentially the same thing, apparently Bob is chasing an opportunity and needs some questions answered as soon as possible. Luckily, Bob left his mobile phone number in one of the messages, which Jim successfully writes down after replaying the message three times. Jim dials the number. Bob doesn't answer so he leaves a voicemail suggesting they talk at 1:00 p.m. Pacific Standard Time.

Bob returns from lunch to find a number of voicemail messages waiting for him. After listening to various irrelevant messages, he discovers that Jim returned his call. Annoyed, but thinking he might reach Jim in person, Bob calls him back, but gets Jim's voicemail instead where he leaves a message confirming the call at 4:00 p.m. Eastern Standard Time and reiterates the importance of the meeting. Bob spends the rest of the afternoon waiting for the call with trepidation knowing that if something goes wrong they'll have very little time to recover, potentially jeopardizing the sale with Jane. At 4:00 p.m., Bob calls, and Jim answers. They discuss the answers to Jane's questions, some of which are beyond Bob's expertise. Bob hangs up concerned that he will not be able to adequately address the issues with Jane. He would really prefer to get Jim, the product manager, on the phone with Jane, but that is nearly impossible while Jim is traveling. Bob will do his best with Jane today, and if necessary, schedule a follow up call between Jane and Jim next week when Jim is back in the office.

The same example user scenario follows in the context of the AMC System described herein. Using the AMC, Bob does not know Jim's phone number, but he can quickly lookup Jim's name in the AMC Active Phonebook on his handset and quickly determine his availability to engage in communication. Bob can see from the Active Phonebook that Jim is currently not available to receive voice calls on his mobile phone. Instead, Bob decides to initiate an Active Call because he knows that this is the quickest way to reach Jim no matter where he is or what he is doing. Before sending the Active Call Request, Bob designates the call as "high priority", and records a short voice subject so Jim can immediately learn the nature of the call.

While engaged in a tour with the plant foreman in San Diego, Jim receives a text alert on his mobile phone accompanied by an audible tone and vibration. Jim glances at the alert and sees that it is an urgent call request from Bob in Sales. Not wanting to delay the tour, Jim uses one of the AMC quick response options to discreetly respond to Bob indicating that he will be available to talk in about one hour. Bob receives Jim's reply in the form of a confirmation alert indicating that Jim will be available for a voice call in an hour. Knowing that time is of the essence, Bob opts instead to queue the call just in case Jim is available sooner. By queuing the call request, Bob asks the AMC facilitator to automatically notify him once Jim's availability status changes. Confident that the AMC system is actively managing their communications, Bob goes about his business at the trade show.

Forty-five minutes later, Jim finishes the tour and steps outside where he can talk. In the process, he toggles his AMC availability profile to notify the calling community that he is now available to receive voice calls. The AMC server updates the change in Jim's status, and immediately sends Bob an alert indicating that Jim is now available to talk. Using the interface embedded in the alert, Bob calls Jim. Jim answers the phone and they proceed to discuss answers to Jane's questions, some of which are beyond Bob's expertise. Not wanting to risk the sale, Bob suggests they both talk with Jane. Jim agrees to be available for a follow up call if necessary saying, "Just active call me and I'll step outside and be available within five minutes". After hanging up, Bob is relieved that one AMC active call to Jim eliminated the multiple phone calls, coordination, and interruptions that would have been required to address this typical customer request in the past.

The AMC system is logically divided into the facilitator or facilitator architecture, the AMC client or AMC client architecture, and a protocol that couples the AMC clients to the facilitators. As described above with reference to FIGS. 1-7, the AMC clients run on communication devices or handsets. The AMC client is an application that runs on a variety of off-the-shelf mobile devices and telephones, for example, supporting open application environments such as the Symbian OS™, QUALCOMM's Binary Runtime Environment for Wireless (BREW™), as well as other application environments available from Palm, Microsoft, and Sun Microsystems, but is not so limited. Users or subscribers can download and deploy the AMC client over the air and/or over wired connections; further, the AMC client can be pre-loaded in the memory of the host device, or displayed as a thin client (e.g., browser or web client). The AMC clients are loosely coupled via the protocol to a facilitator that in some embodiments is hosted on a server but in other embodiment can be hosted on one or more processor-based devices.

In the AMC system two endpoints communicate over a client-server protocol. When the two endpoints include an AMC client and facilitator data or information is transferred between the AMC client and the facilitator using one or more couplings. The data coupling may be via a number of protocols including but not limited to Hypertext Transport Protocol (HTTP), Transmission Control Protocol (TCP), User Datagram Protocol (UDP), Session Initiation Protocol (SIP), and Wireless Application Protocol (WAP). Furthermore, the data coupling may be via a number of messaging standards including but not limited to Multimedia Messaging Service (MMS), Short Message Service (SMS), and Enhanced Messaging Service (EMS).

Figure 8:
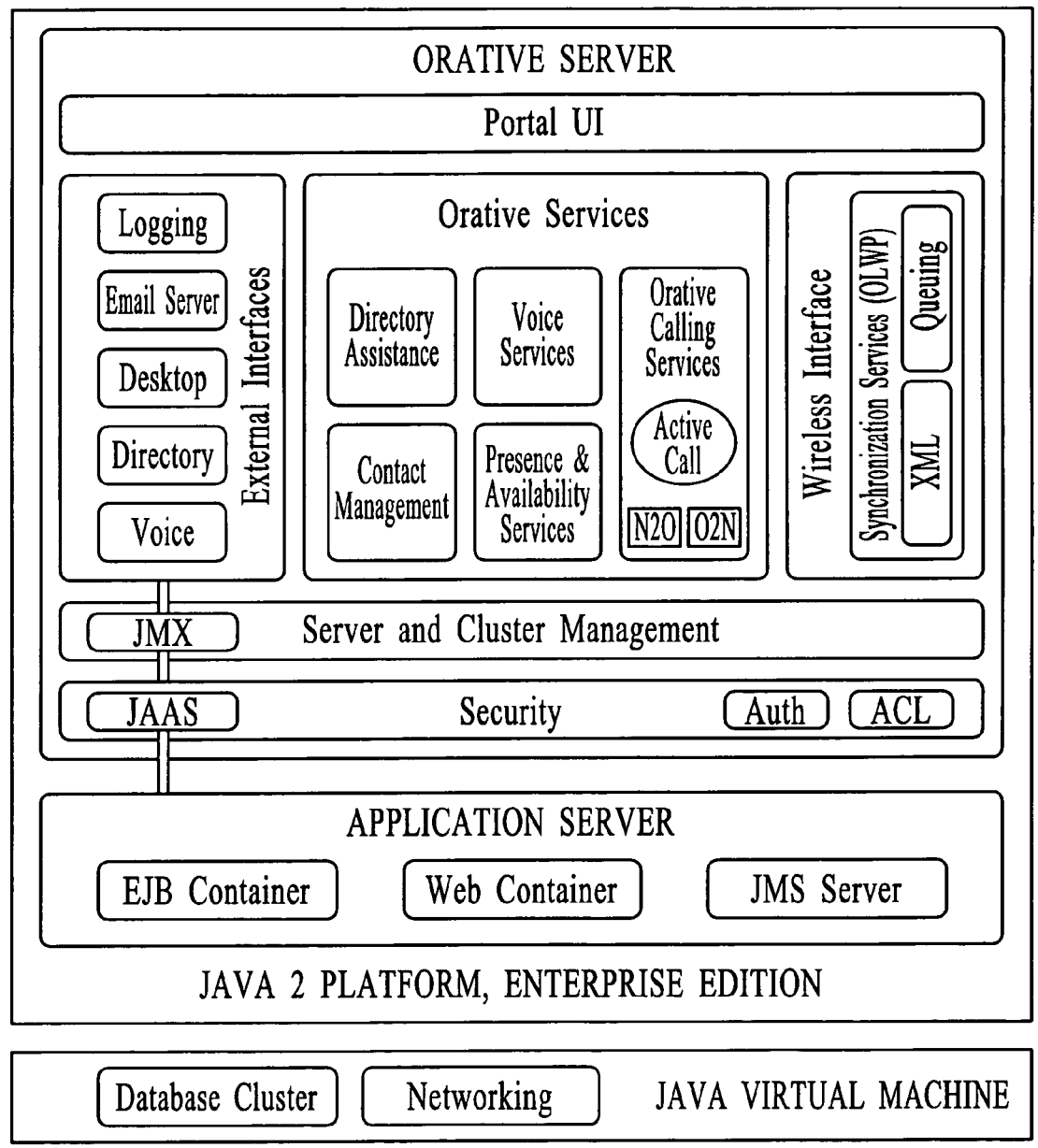
FIG. 8 is a block diagram of an AMC facilitator on a platform, under an embodiment.
Figure 9:
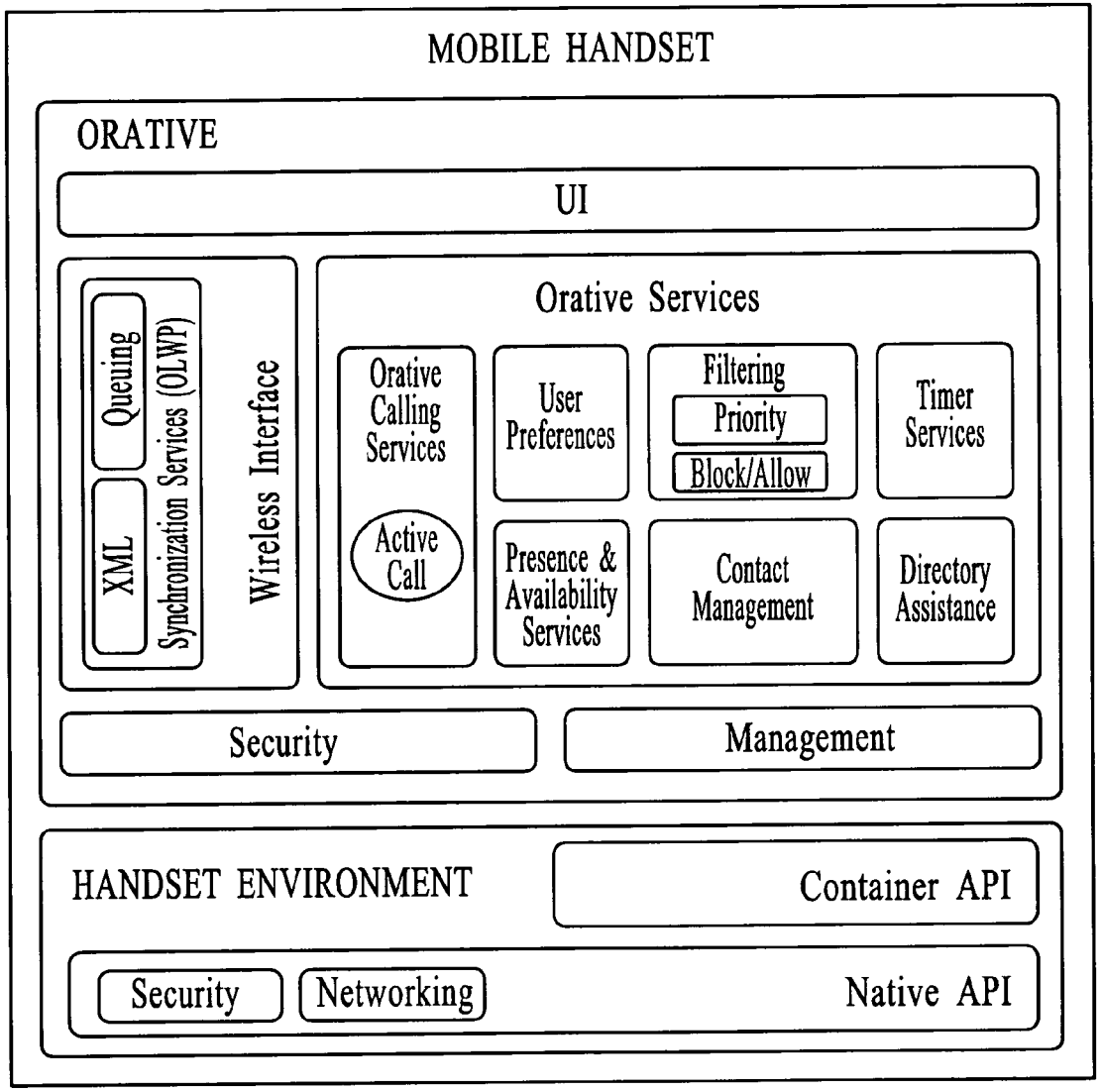
FIG. 9 is a block diagram of an AMC client hosted on a mobile handset, under an embodiment.

FIG. 8 is a block diagram of an AMC facilitator on a platform or server, under an embodiment. The platform hosting the AMC facilitator is a Java 2, Enterprise Edition (J2EE), but is not so limited. FIG. 9 is a block diagram of an AMC client hosted on a mobile handset, under an embodiment. The mobile handset can be a cellular telephone or other wireless communication device, but the embodiment is not so limited. The AMC client and facilitator are further described in detail below.

Components of the AMC client and the facilitators include intra-domain and inter-domain routers. These routers serve to route messages between AMC clients and facilitators, between facilitators, or a specific functional module (e.g., Active Call, Availability Management) within a facilitator.

The routers operate in an incoming mode and an outgoing mode. In the incoming mode (caller is the client interface layer) the routers receive commands from AMC clients and route them to a functional module based on the message type. In the outgoing mode (caller is a server functional module) the routers receive outgoing commands and route them to either an AMC device, to another facilitator within the domain, or to another domain.

In the incoming mode the router acts like a simple router; it examines the message type and routes it to the appropriate functional module. Two errors are treated in this mode. First, if the message type is invalid, then an exception is generated and returned. Second, if the serverID is invalid because a facilitator with this ID no longer exists, then the correct backup facilitator is determined and a redirect message is sent back to the AMC client. If the serverID is invalid for any other reason, an exception is transmitted back as a response. An invalid serverID would also result in a session mismatch, then the identity attribute will be empty; this guarantees that all messages sent from the AMC client to this facilitator can still be sent to the functional modules, because they will simply return access control exceptions.

In the outgoing mode, the router functions to route the message to an AMC client, another facilitator within the domain, or to another domain. The router uses the target username/domain pair of the message to determine the target server where: if the target domain is the same as its facilitator's domain, the router looks up the home facilitator of the target in a (database) table and assigns this value as the destination facilitator; and if the target domain is different from its facilitator's domain, the router assigns the value "amc.<domain name>" as the name of the destination facilitator.

There is always a destination facilitator for a message, even if the session of the message's target user has expired. The message is always routed to the user's home facilitator. If the home facilitator has failed, the message is instead routed to the user's backup facilitator. The assumption is that foreign domains don't have a single point of failure and can always receive the message.

If the destination facilitator is the originating facilitator, this indicates the message needs to be routed to one or more destination clients. The set of active destination devices for this user is found in a database table map (key is username and active flag; value is a set of destination device unique identifiers). A device is uniquely identified by a DNS name/IP address and port pair or phone number and carrier pair. The message is then placed in the user's queue and the rate controller per each active destination device is notified of the event.

In case of facilitator-to-facilitator routing, the message is placed in the facilitator's queue and the target facilitator's rate controller is signaled with the event. Facilitator-to-domain routing is identical to facilitator-to-facilitator routing.

Authentication ascertains the user identity for AMC client-facilitator and portal-facilitator communications and the server identity for facilitator-facilitator communication. User authentication of an embodiment is performed via the Java JAAS API of the facilitator. This API supports many forms of authentication including basic username/password mechanisms to more complex challenge/response mechanisms.

Historically, landline based calling implicitly indicated location, which caller's used to mediate the scope and content of call conversations before initiating the call. Mobile calling removed this inherent contextual cue resulting in frustration and inefficient calling practices. Today receiver's have only Caller Identification (ID) (referred to as Caller ID) to use as a contextual cue in determining whether or not to answer an incoming call. Furthermore, mobile calling introduced additional problems stemming from inconsistent network coverage, resulting in confusion over whether or not a callee is available to receive a call. All of these problems have lead to increased reliance on voicemail and protracted "phone tag" sessions.

The AMC system of an embodiment reduces these calling problems by facilitating the exchange of contextual data before a mobile call takes place giving would be callers (call originators) important cues as to the appropriateness of their conversation to the receiver's (call recipient's) current situation. Components of the AMC system monitor the availability state of each user or subscriber (where the user has a handset hosting the AMC client) and broadcast that state to interested parties or "watchers". In addition the AMC system introduces an Active Call Request that allows a caller to politely ask a receiver if the receiver is ready to take a phone call, and provides discreet response options by which the receiver can provide timely feedback to the caller. Callers have the satisfaction of knowing the receiver acknowledged their call request and will make time to talk.

Contextual availability management empowers users with greater granularity and control over their ability and willingness to communicate from their handset throughout the workday. Users control their availability state from their handsets through selection of an availability profile, where users tailor the availability profiles to suit their personal needs and tastes. Users are encouraged to change their profile whenever their ability to receive and process communications changes, such as entering and leaving a meeting. Availability profiles are controlled manually via direct user action, for example, as well as automatically via predetermined rules selected by the user and/or information of the user's calendar.

When a user initiates a call request, the facilitator of the AMC system for example monitors the communication. When the message is delivered successfully, the facilitator sends the caller a delivery confirmation. If the receiver is not reachable (e.g., off the mobile network) the facilitator queues the request and delivers it as soon as possible. If the message can't be delivered before it expires, the facilitator notifies the caller that the request was undeliverable and explains why. In this way callers are never left wondering whether or not their message was delivered.

The AMC system also lets called users pre-screen phone calls and call requests through filters based on the originator's phone number and the urgency of the request. When AMC call requests do come through, the AMC system provides additional contextual data, such as call urgency and subject material that subscribers can use to manage their time more efficiently. Thus, information of context determines the best communications modes to connect people wherever, whenever desired (e.g., voice, voice to text, text only).

An availability profile of an embodiment includes two components, handset behavior options (e.g., ringer settings) and call screening filters. Handset behavior options define the behavior when an AMC call request or ordinary mobile call is received. Options include controlling ringer volume, and defining the notification audible and volume for incoming AMC messages. The profile allows users to remain open and responsive to communication while offering a level of discreetness not typically available on phones. For example, instead of running the risk of interrupting a meeting when an important call request comes in and turning the phone off completely, the AMC system allows the user to quietly receive the request and discreetly respond to the caller, potentially postponing the call until a later time when both parties can talk freely.

Call screening filters combine with the handset behavior options to control the callers and call requests that are announced to the user. Together with the behavior options the call screening filters define whether or not the subscriber is available to engage in communication. For example, a user might define and select an availability profile that indicates he/she is available to talk, but only for urgent call requests from a select group of callers. Screened callers are sent a polite response indicating they should call back later. Another example is the "Do Not Disturb" profile that screens all callers and AMC call requests, sending a message to the would-be callers that the user is hot currently available to talk.

In order to manage the message flow between callers, components of the AMC system monitor each subscriber's level of network connectedness (i.e., whether they are reachable or not) and their willingness to communication (i.e., availability). Availability is a user experience that allows subscribers to control and limit their desired means of communication. Users directly control their availability through selection of profiles. Each handset profile includes a parameter that designates availability state ("yes" or "no"); users are either "available" or "not available". Additionally, states of "limited availability" are provided. Typically the "do not disturb" profile is one profile that specifies "not available", but other profiles can be used to indicate that a user is not available. The availability state is broadcast to other AMC subscribers who have placed the user in their Active Phonebooks, where it is displayed graphically next to the user's name. However, users are also considered not available to certain other subscribers if their call screening setting(s) would filter out call requests from those subscribers.

Alternatively, reach is a mobile network state that is largely out of the user's control. Users are "reachable" if their mobile phone is turned on and they have a consistent and reliable connection to the mobile data network (e.g., GPRS). They are "not reachable" if they are disconnected from the mobile data network, engaged in a voice call, or have their mobile handset turned off. A highly mobile person (e.g., driving) will most likely have an erratic reachable state. The reachable state takes precedence over availability; at any given time subscribers may be reachable or not, regardless of their availability state.

The combination of a user's reachable state and availability determines how the AMC system manages call requests and directs notifications to the user. The AMC system always knows the availability state of each user by virtue of their selected handset profile and the call screening filters they have active. Mobile phones and the programming environments they support do not always know when the mobile data network is reachable. The AMC system typically will not know the reachable state of a user until it tries to contact them over the mobile data network.

The combination of reach and availability yields four user states that include available and reachable, available and not reachable, not available and reachable, and not available and not reachable. The available and reachable user state results in the AMC system immediately sending call requests and user notification of incoming communications. The available and not reachable user state results in the AMC system holding call requests until delivery is possible. The not available and reachable user state results in the AMC system immediately sending call requests, but the notification may be suppressed by the receiving handset. The not available and not reachable user state results in the AMC system holding call requests until delivery is possible, with notification possibly suppressed by the receiving handset. Generally then, the AMC system always sends call requests and notifications to users if they are reachable, regardless of their availability state, and when possible informs the request originator as to how the request was dispatched. Receiver's are not under obligation to respond, regardless of their availability state.

Components of the AMC system support selection on the handset of an availability profile from a group of profiles. User creation and modification of availability profiles is supported through the portal, described above with reference to FIG. 1. The selected profile for each user is maintained when the AMC client is shut down and restarted and is not reset to the default profile. Downloading of user-defined profiles to the user's handset can be initiated from the portal and from the handset.

Changes in availability profile are propagated to the facilitator by the AMC client upon subsequent connection of the host handset to the facilitator. In response to availability profile changes, the facilitator propagates the availability states to AMC clients for display on Active Phonebooks. Whenever the facilitator receives an availability profile change notification, the availability state is propagated to the AMC clients who are "watching" the subscriber when the handset that includes the watching AMC is powered on and the handset and facilitator connect for any purpose. When a subscriber views their Active Phonebook, the AMC client automatically requests an update from the facilitator for all entries in the phonebook if any entry in the Active Phonebook is stale.

A number of states are recorded to determine a handset's reachable state including, but not limited to, handset powered on, handset powered off, handset connected to the associated data network and able to communicate, and handset not connected to the associated data network.

Availability profiles of an embodiment also include call screening or filter attributes that a user may turn on or off depending on their personal needs. The AMC system of an embodiment supports Priority, Allow List, and Block List filters, but is not so limited. Activation of these filters is achieved by selecting an availability profile. Various combinations of the filters are allowed, and each profile may have a different combination of filters. Users create profiles from the portal depending on their personal needs and desires.

The priority filter defines the minimum level of AMC message priority for which the user is willing to receive notification. The user receives all AMC messages, but is only notified (e.g., audible alerts) upon receipt of a message designated at or above the allowed priority level. The characteristics of the notification are defined by the currently active availability profile. The Priority filter can act alone or be combined with the Block and Allow Lists to filter the AMC message traffic permitted by the Block and Allow Lists.

The Priority filter allows user selection of one priority value from among "Normal", "Important", and "Critical" priorities. Selection of the Priority filter indicates the minimum level for which the user wants to receive AMC message notifications (e.g., audible alerts). For example, if the user selects "Important", he/she is notified when AMC messages with the priority set to "Important" and "Critical" are received.

The Allow List filter defines a list of phone numbers and/or AMC subscriber names for which the user wishes to receive notification. The user receives all AMC messages and mobile calls as normal, but is only notified (e.g., audible alert) when a message or mobile call is received from a member of the Allow List. The characteristics of the notification are defined by the currently active availability profile. Messages from people who are not members of the Allow List are still delivered to the handset but not accompanied by a notification. Phone calls by non-members of the Allow List are transferred to voicemail if possible.

The Allow (Only) List contents include phone numbers and subscriber names for allowed parties as well as caller groups. The Allow List filter also supports allowing calls based on international phone numbers. Duplication of entries between the Allow List and Block List is not permitted. Phone numbers can be added to and deleted from this filter from the host handset. Changes to the Allow List at the handset are updated at the facilitator the first time the handset and facilitator connect after the change. The subscriber can add, delete, and otherwise modify the contents of the Allow List at the portal, and changes to the Allow List at the portal are transferred to the subscriber's handset the first time the handset and facilitator connect following the change. Notifications of AMC call requests from members of the Allow List are provided to the handset; all other call requests are delivered to the handset without notification.

Incoming phone calls from members of the Allow List are handled by the AMC client so that the handset rings subject to the active availability profile, but the embodiment is not so limited.

The Block List filter defines a list of phone numbers and/or AMC subscriber names from which the user wishes not to receive AMC messages or mobile phone calls. Blocked AMC messages are never delivered to the subscriber's handset, but are not so limited. An incoming mobile call from a number or name on the Block List is screened completely so that the called phone does not ring and the caller is not transferred to voicemail (if possible); the call is ignored completely.

The Block List filter contents include phone numbers and subscriber names for parties to be blocked. The Block List filter also supports blocking based on international phone numbers. Phone numbers can be added to and deleted from this filter from the host handset. Changes to the Block List at the handset are updated at the facilitator the first time the handset and facilitator connect after the change. The subscriber can add, delete, and otherwise modify the contents of the Block List at the portal, and changes to the Block List at the portal are transferred to the subscriber's handset the first time the handset and facilitator connect following the change. AMC call requests from members of the Block List are blocked by the facilitator, where the facilitator provides a pre-specified message to the requesting device. Incoming phone calls from members of the Block List are blocked by the AMC client so that the handset will not ring and the caller is not transferred to voicemail, but the embodiment is not so limited.

The AMC system components of an embodiment support numerous filter combinations within the availability profiles. These filter combinations include for example the following combinations: all filters off; Priority on/off, Allow List on, Block List off; Priority on/off, Allow List off, Block List on; and Priority on/off, Allow List on, Block List on. With all filters off, all messages and mobile calls are allowed through to the handset. The notification characteristics are defined by the currently active availability profile.

Selection of the Priority on/off, Allow List on, Block List off combination results in providing notification for incoming AMC messages or mobile calls from members of the Allow List only. If the Priority filter is engaged, allowed AMC messages are further filtered, and notification is provided only for the selected priority levels.

Selection of the Priority on/off, Allow List off, Block List on combination results in blocking of incoming AMC messages or mobile calls from members of the Block List so that the AMC messages are not delivered to the handset. Further, mobile calls do not activate the handset ringer and are not transferred to voicemail. If the Priority filter is engaged, AMC messages that are not blocked are filtered, and notification is provided only for the selected priority levels.

Selection of the Priority on/off, Allow list on, Block List on combination results in the Block List taking precedence so that no message or mobile call from a member of the Block List passes to the handset, and only messages or mobile calls from members of the Allow List result in handset notification (e.g., audible alerts). All other messages are not accompanied by notification, and mobile calls may be transferred to voicemail if possible. If the Priority filter is engaged, allowed AMC messages are further filtered, and notification is provided for the selected priority levels only.

The AMC system of an embodiment supports multiple default availability profiles including, but not limited to, working, meeting, driving, home, and do not disturb profiles. Alternative embodiments, however, can include numerous possible default profiles. As an example, parameters of a working profile of an embodiment are as follows: modes—voice; available—yes; ringer volume—5; vibration—on; alert notification volume—7; flash LED—off; Priority Filter—normal; Block List—off; Allow List—off; and reminder tone—on. An example meeting profile of an embodiment is as follows: modes—text; available—yes; ringer volume—off; vibration—on; alert notification volume—1; flash LED—on; Priority Filter—important; Block List—off; Allow List—off; and reminder tone—off. An example driving profile of an embodiment is as follows: modes—voice, PA; available—yes; ringer volume—maximum; vibration—on; alert notification volume—maximum; flash LED—off; Priority Filter—normal; Block List—off; Allow List—off; and reminder tone—on. An example home profile of an embodiment is as follows: modes—voice, text; available—yes; ringer volume—7; vibration—off; alert notification volume—maximum; flash LED—off; Priority Filter—critical; Block List—on; Allow List—on; and reminder tone—off. An example do not disturb profile of an embodiment is as follows: modes—text; available—no; ringer volume—off; vibration—off; alert notification volume—off; flash LED—off; Priority Filter—critical; Block List—off; Allow List—off; and reminder tone—off.

Components of the AMC system of an embodiment support numerous calling features. Generally, the AMC system functions to alleviate stress and worry resulting from voicemail "phone tag" and unfulfilled communication attempts. To this end, the AMC system provides a high degree of user feedback during the call flow processes to foster a strong sense of confidence in the AMC system and eliminate the stress of wondering whether or not a message was received or a call request returned. This user feedback includes providing delivery status and confirmation information that keeps the user abreast of what state his/her call request(s) is in the AMC system at all times. For example, the handset user interface includes a graphical indication that depicts what state the call request is in, and in cases where a message can not be delivered, the AMC system provides the request originator with a message that includes a description of the failure.

In providing the feedback, components of the AMC system accurately and reliably determine a subscriber's reachable state so that, assuming a caller has not been blocked by a recipient, the AMC system can always send call requests and notifications to subscribers if they are reachable, regardless of their availability state. Further, the AMC system informs the message originator how their request was dispatched. Receivers of a call/request are never under any obligation to respond to the originator, regardless of their availability state. In most cases the receiver in an AMC system call flow is considered to be a passive participant and it is assumed that the receiver has neither requested to be involved nor has knowledge prior to receiving a request that he/she will be involved. Consequently when a communication breakdown occurs the message originator is typically the only party notified (there is no need to notify the receiver because he/she didn't know he/she was going to receive the request).

While the AMC system facilitates communication between people, it does not force people to communicate if they don't wish to communicate. The receiver of a call therefore always has the final say whether or not to respond to a call request, follow through with a previously queued call, or answer the phone. Situations arise that result in extraneous and obsolete alerts in the AMC system, and the AMC system uses expiration logic to automatically clean up expired or obsolete call requests, responses, and notifications.

Using the expiration login, in some cases, the call initiators will determine the expiration time for their request. For example when issuing a call request, the caller has the option to specify a time period after which the request is no longer valid or meaningful. In other cases, components of the AMC system impose expiration times on the call flows and messages.

As an attribute of delivery confirmation, the AMC system also uses the expiration times to keep call participants informed when receivers do not respond to requests in a timely manner, or persist in being not reachable. When necessary the AMC system cleans up expired messages by removing them from facilitator message queues. In general, expiration and automated cleanup depends on where the alert was initiated. A user initiated call request may need to be kept for some period of time because the receiver may want to refer to it or act on it in the future. In contrast, system generated notifications and informational messages are transient and are generally cleaned up regularly after the user has seen and read them, but the embodiment is not so limited.

Delivery confirmation states include the various states and state transitions with which the AMC system tracks user initiated messages. The state transitions are sent to the message originator where they are displayed on the handset UI. In an embodiment the presentation of the states is accomplished through graphical icons in an Outbox view of the UI, but the embodiment is not so limited.

Messages are delivered to intended recipients the next time the facilitator and AMC client of the recipient handset(s) connect, regardless of the recipients availability state (i.e., a message is delivered whether the recipient is available or not available), subject to applicable filters. Components of the AMC system including at least one of the AMC client and facilitator record the current state of each message sent by a subscriber (e.g., requests, responses, voice IM). The states and state transitions recorded by the AMC system include "Not sent", "In Transit", "Delivered", "Failed to deliver", "Request expired", "Being retracted", and "Failed to retract" states, but are not so limited. If the AMC facilitator determines the recipient of a message is reachable but not available, the message will be delivered to the recipient anyway. Expiration for the notification of message state transitions in an embodiment is as follows, but is not so limited: "Not sent" state expires upon message expiration; "In Transit" state expires upon message expiration; "Delivered" state expires upon message expiration; "Failed to deliver" state expires in 72 hours; "Request expired" state expires in 24 hours; "Being retracted" state expires in 2 hours; and "Failed to retract" state expires in 8 hours.

All messages initiated by subscribers begin in the "Not Sent" state. This state ends when the message is successfully delivered to the AMC facilitator, the message expires, or the message is retracted or deleted. The AMC client of the originating device is informed when the "Not Sent" state is entered and exited.

The "In Transit" state begins when a message is successfully delivered to the facilitator. This state ends when one of the following conditions occur: the recipient handset successfully receives message; the message expires; and the message is retracted or deleted. The AMC client of the originating device is informed when the "In Transit" state is entered and exited.

The "Delivered" state begins when a message is successfully delivered to the intended recipient's handset. This state ends when one of the following conditions occur: the message is deleted by the recipient; the subscriber does not respond before a message expires; the message is retracted; and the message is forwarded to another subscriber. The AMC client of the originating device is informed when the "Delivered" state is entered and exited.

The "Failed to Deliver" state begins when delivery of a message to an intended recipient fails. In the "Failed to Deliver" state the AMC system continues to try and deliver a message to the intended recipient(s) until the message expiration is reached. When this happens, the AMC system sends a notification message to the originator with a description of the failure (to the extent possible). If a user-defined expiration is not specified, the AMC system uses a default expiration value. Note, this implicitly requires each message to have a finite expiration period defined.

When a message can not be delivered to the intended recipient components of the AMC system deliver a Failed to Deliver alert message (OS-1a) to the message originator. FIG. 10 is a template of the Failed to Deliver alert message (OS-1a), under an embodiment. The Failed to Deliver alert message (OS-1a) is tailored to a number of failure conditions. A first failure condition is when the originator's AMC client detects that communication has failed with the facilitator, and generates alert text as follows: "AMC could not deliver your message to <recipient's name> at <time created> due to a problem communicating with the AMC facilitator." A second failure condition is when the AMC system detects that communication has failed with a downstream facilitator, and generates alert text as follows: "AMC could not deliver your message to <recipient's name> at <time created> due to a problem communicating with the AMC facilitator." A third failure condition is when the AMC system detects that communication has failed to an AMC client, and generates alert text as follows: "AMC could not deliver your message to <recipient's name> at <time> due to a problem communicating with the recipient's handset." When a message expires before it can be delivered, the message state is set to "Failed to Deliver", and the originator's informed of the state change.

The "Request Expired" state begins when the recipient of a request has intentionally chosen not to respond, either by deleting the request without responding to it, or ignoring it until it expires. The AMC client monitors the recipient's behavior and notifies the message originator if the recipient ignores or deletes a request without responding, and offers the option to resend the original request. This is different than a failed delivery in that the message was successfully delivered to the recipient, but the recipient never responded and the message expiration was reached.

The AMC system detects a number of conditions for the monitored messages and the messages are considered expired when any of these conditions is met. The detected conditions include when a recipient does not respond to a request before the expiration time is reached, and when a recipient does not listen to a voice IM before the expiration time is reached. When a monitored message expires (per above), the state is set to "Request Expired", and the originator's AMC client informed of the state change.

The AMC system maintains a copy of outgoing requests for purposes of facilitating a "send again" in the event a monitored message expires, and the copies are saved for a pre-specified period of time before being deleted. The message state for messages that are resent is set to "Not Sent".

The "Being Retracted" state begins when an originator retracts a message. Messages in one of the "Not Sent", "In Transit", and "Delivered" states can be retracted, for example. The AMC client of the message recipient's handset is informed when a message is retracted and, once retracted, the recipient's detail view of the message (UI) provides an indication the message has been retracted. The detail view corresponding to the message on the originator's handset also provides an indication the message has been retracted. When a retraction fails due to a communication problem (i.e., delivery failure) the message state is set to "Failed to Retract" and the AMC client of the originator's handset is informed of the state change.

The AMC system provides an Active Call Request as described above by which a call originator can politely ask an intended recipient if the recipient is ready to take a phone call, and provides discreet response options by which the recipient can provide timely feedback to the originator. Callers thus have the satisfaction of knowing the receiver acknowledged their call request and will make time to talk.

The AMC system, upon initiation of an Active Call Request, provides the originator various options to tailor the request to his/her unique situation and to provide more context to the intended recipient(s). Active Call Requests support numerous input options including priority, text subject, voice subject, originator's phone number, and expiration time to name a few. The priority input option allows the user to select one of Normal, Important, and Critical priorities. The Normal priority is the lowest level and the Critical priority is the highest level, but the embodiment is not so limited.

The text subject input option allows end-user keying of a text subject tag. An embodiment supports selection of pre-defined text subjects, and the portal supports definition of the pre-defined text subjects.

The voice subject input option supports the user recording a voice subject of a pre-specified duration via a handset interface. The voice subjects are stored on the handset to facilitate offline usage, but are not so limited. The voice subject of an embodiment is kept on the originating handset until successful delivery of the voice subject to the facilitator.

The originator's phone number input option supports end-user keying of phone numbers and embedding of these phone numbers in the request alert. The default number is the originator's mobile phone number.

The expiration time input option allows the end-user to input an expiration time value at the handset to specify a time period after which the call request automatically expires. A maximum expiration period is no more than 72 hours in the future, and a default expiration time is 180 minutes, but the embodiment is not so limited.

Figure 11:
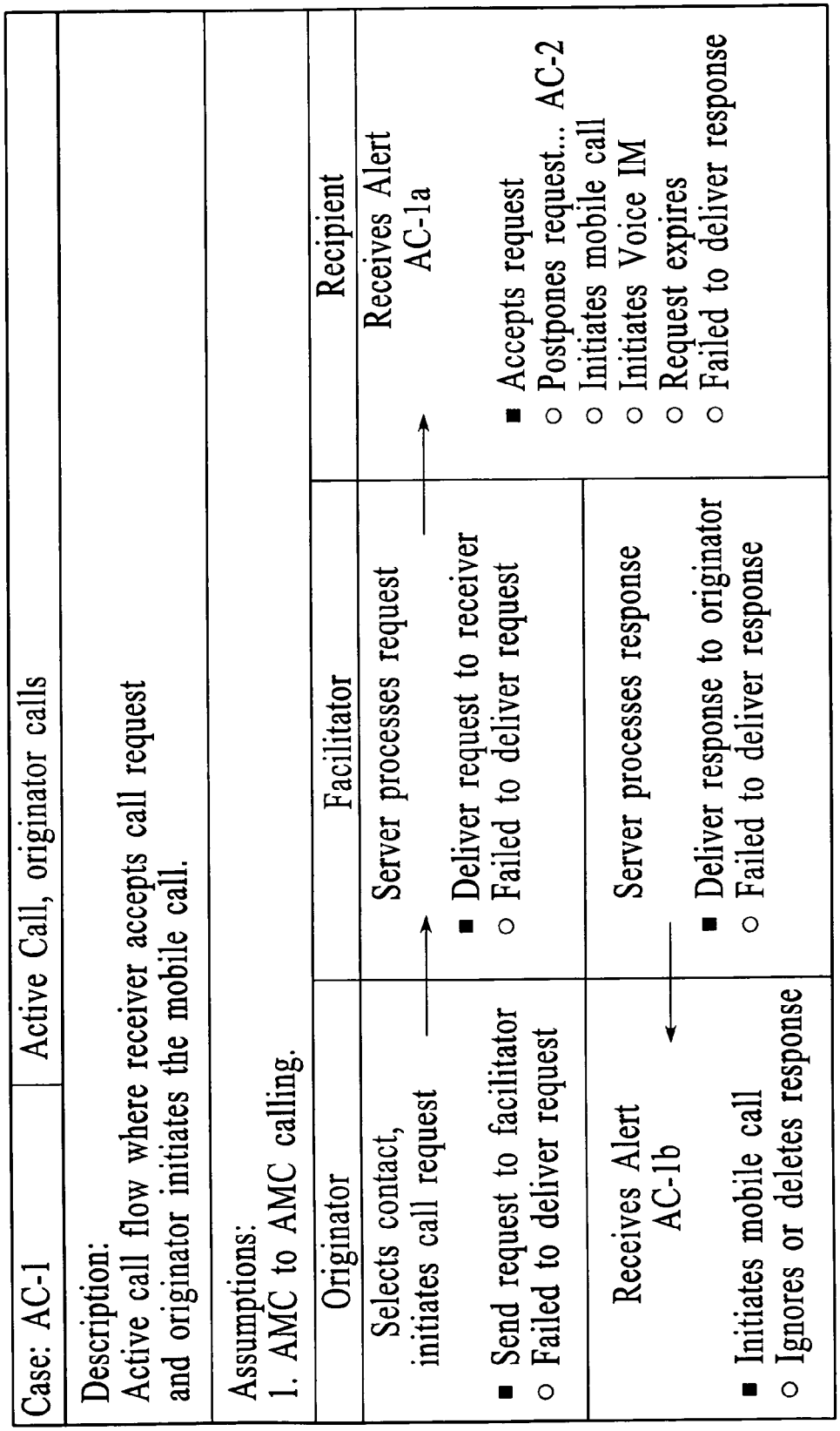
FIG. 11 is a flow diagram for an Active Call (AC), under an embodiment.

FIG. 11 is a flow diagram for an Active Call (AC), under an embodiment. An Active Call begins when an originator selects a contact and initiates an Active Call request to the contact using the originator's handset. The facilitator processes the call request and in response forwards an alert message to a handset of the selected contact, where the alert message is referred to herein as a Notification of Active Call Request alert message (AC-1a).

The flow diagrams provided herein include logic flows that start in the upper left-most cell and proceed to the right, then down, and back to the left, row-by-row (see arrows) until the lower left cell is reached. Blank cells are treated as no-ops and any cell that is blank is skipped. Arrows are used in the call flow to direct the flow for the reader. Generally, caller/originator behavior is always on the left, AMC facilitator behavior in the middle, and call recipient behavior on the right. Within the call flow the action taken by a party (originator and/or recipient) is shown followed by the possible responses (bulleted). The normal response course is designated with a solid bullet, and alternative courses are designated with hollow bullets.

FIG. 12 is a template of the Notification of Active Call Request alert message (AC-1a), under an embodiment. This alert message is sent to the recipients of an Active Call Request to inform the intended recipient that a caller wishes to speak with him, and provides convenient options for responding to the request. The Notification of Active Call Request alert message supports a number of response options by the recipient including accepting the request with the recipient's handset phone number, accepting the request with a phone number input by the recipient, initiating the mobile call to the originator using the value in the originator's phone number field of the alert message, responding with a pre-defined text message, initiating a voice instant message to the originator, deleting the request, and requesting a postponement of the call. Actions by the recipient including accepting the call request, initiating the mobile phone call, responding with a pre-defined text message, and initiating a voice instant message to the originator result in automatic deletion of the alert message from the recipient's inbox, but the embodiment is not so limited. Further, information of delivery confirmation states of the Notification of Active Call Request alert message is provided to the originator.

The facilitator processes any response by the receiver and in response forwards an alert message to the originator, where the alert message is referred to herein as a Notification of Active Call Request Acceptance alert message (AC-1b). FIG. 13 is a template of the Notification of Active Call Request Acceptance alert message (AC-1b), under an embodiment. This alert message notifies the originator that the intended recipient of the Active Call Request has accepted the request and that the recipient is ready to participate in the call. Further, the Notification of Active Call Request Acceptance alert message provides the originator with response options that include a one-button mechanism for initiating a mobile call to the recipient, and an option to delete the alert message. Additionally, information of delivery confirmation states of the Notification of Active Call Request Acceptance alert message is provided by the facilitator to the receiver.

Regarding a postponement request to postpone the call from the recipient of an Active Call Request, the Notification of Active Call Request alert message (AC-1a) described above with reference to FIG. 12 is the primary means of initiating the postponement logic flow. FIG. 14 is a flow diagram for an Active Call in which the recipient requests a postponement, under an embodiment. As described above, an Active Call begins when an originator selects a contact as an intended recipient and initiates an Active Call Request to the contact using the AMC client of the originator's handset. The facilitator processes the call request and in response forwards an alert message to a handset of the selected contact, where the alert message is referred to herein as a Notification of Active Call Request alert message (AC-1a). In response, the receiver requests a postponement of the call using a response option provided in the Notification of Active Call Request alert message. The facilitator processes the postponement request from the recipient and in response generates and transfers a Request to Postpone Active Call alert message (AC-2a) to the originator.

FIG. 15 is a template of the Request to Postpone Active Call alert message (AC-2a), under an embodiment. This alert message notifies the originator that the intended recipient of his Active Call has requested that he call back at a later time. The alert message includes a convenient text subject informing the originator of the wall clock time (originator's time zone) when the call should take place. When the postponement period has expired, the AMC system reminds him via alert when the postponement period has expired and it is time to call. The originator also has the option to reject the postponement by deleting or not accepting the alert. Actions by the originator including accepting the postponement request result in automatic deletion of the alert message from the originator's inbox, but the embodiment is not so limited. Further, information of delivery confirmation states of the Request to Postpone Active Call alert message (AC-2a) is provided by the facilitator to the recipient.

The AMC system of an embodiment provides messages to alert the originator upon expiration of the postponement period. The alert message includes information as to availability of the recipient, but is not so limited. As an example, FIG. 16 is a template of the Notification Postponement Period Complete alert message (AC-2b) provided to an originator when the recipient is available, under an embodiment. This alert message notifies an Active Call Request originator that the previously accepted and scheduled postponement period has expired and it is now time to call the intended recipient. The alert message is generated when the availability state of the receiver is "available". The Notification Postponement Period Complete alert message provides the originator with response options that include a one-button mechanism for initiating a mobile call to the recipient, an option to re-send the Active Call Request, and an option to delete the alert message. Actions by the originator including initiating the mobile call and re-sending the Active Call Request result in automatic deletion of this alert message from the originator's inbox, but the embodiment is not so limited. Additionally, information of delivery confirmation states of the Notification Postponement Period Complete alert message (recipient available) is provided by the AMC facilitator to the recipient.

In contrast, FIG. 17 is a template of the Notification Postponement Period Complete alert message (AC-2c) provided to an originator when the recipient is unavailable, under an embodiment. This alert notifies an Active Call Request originator that the previously accepted and scheduled postponement period has expired and it is now time to call the intended recipient, and is generated when the availability state of the receiver is "unavailable". The Notification Postponement Period Complete alert provides the originator with response options that include a mechanism for initiating a mobile call to the recipient, an option to re-send the Active Call Request, an option to initiate watch availability for the recipient, and an option to delete the alert message. Actions by the originator including initiating the mobile call and re-sending the Active Call request result in automatic deletion of this alert message from the originator's inbox, but the embodiment is not so limited. Additionally, information of delivery confirmation states of the Notification Postponement Period Complete alert message (recipient unavailable) is provided by the AMC facilitator to the receiver.

Figure 18:
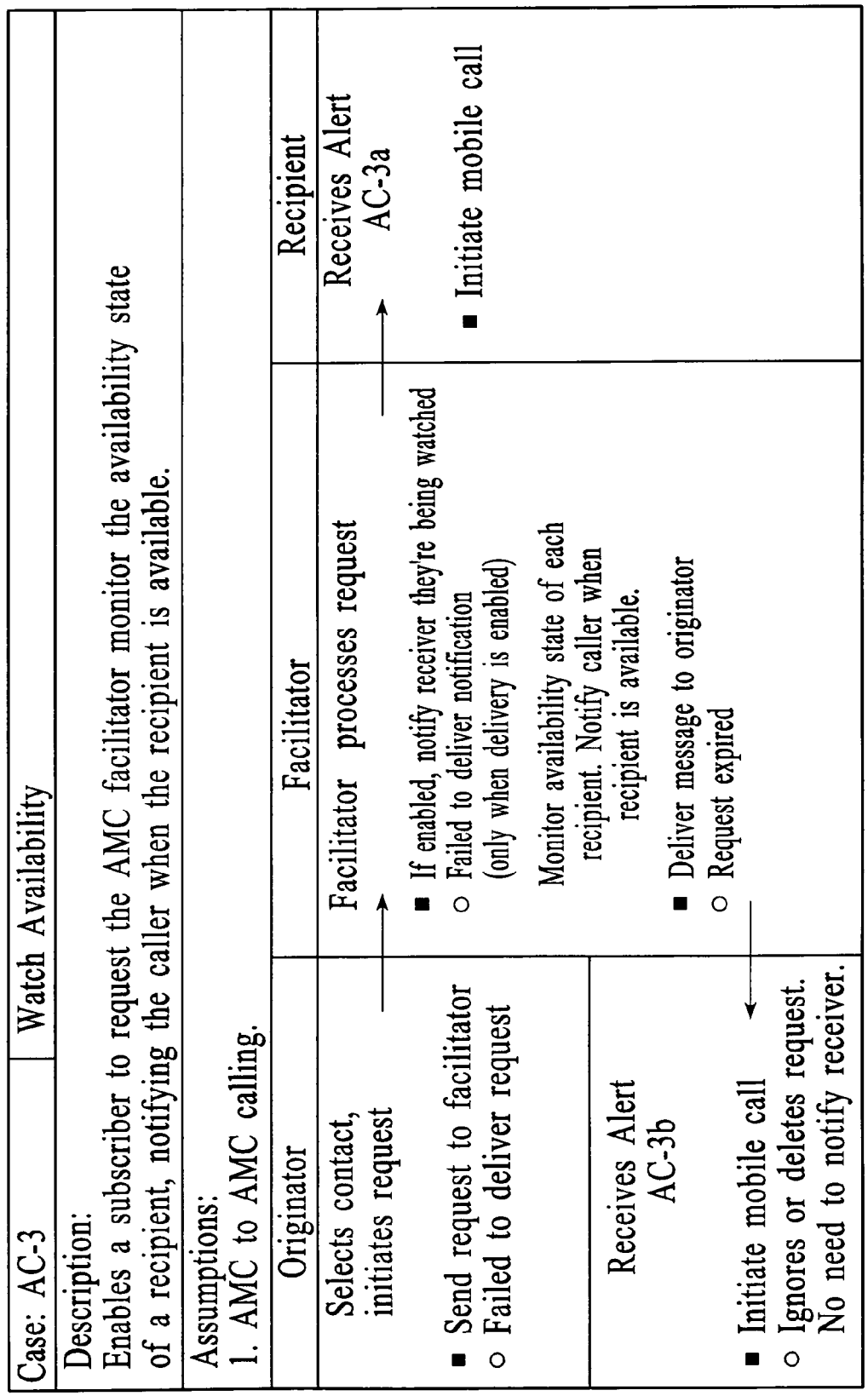
FIG. 18 is a flow diagram for monitoring an availability state (watch availability) of a subscriber, under an embodiment.

The originator can, as described above, request monitoring of the recipients availability when the postponement period has expired and the recipient is unavailable for a call. This requested monitoring of availability, also referred to as watch availability, allows the originator to request the AMC system to notify him/her when an intended recipient's availability state becomes "available" after having been "unavailable". FIG. 18 is a flow diagram for monitoring an availability state (watch availability) of a subscriber, under an embodiment. The watch availability begins when an originator selects a contact and initiates a request to watch the availability of the selected contact. The watch availability request of an embodiment includes an expiration time as specified by the originator, the expiration time defining the time period during which the facilitator monitors the availability state of the selected contact. The facilitator processes the watch availability request and in response forwards an alert message to a handset of the selected contact, where the alert message is referred to herein as a Notification of Availability State Watching alert message (AC-3a).

FIG. 19 is a template of the Notification of Availability State Watching alert message (AC-3a) when the recipient is unavailable, under an embodiment. This alert notifies the recipient that another subscriber (the originator) has requested the AMC system to inform him/her when the recipient's availability state becomes "available". The receipt of the Notification of Availability State Watching alert message is pre-configurable by the recipient via the portal, where the user can elect to receive or not receive the alert message. This alert message provides the recipient with response options that include a one-button mechanism for initiating a mobile call to the originator, and an option to delete the alert message. Actions by the recipient including initiating the mobile call result in automatic deletion of this alert message from the recipient's inbox, but the embodiment is not so limited. Additionally, information of delivery confirmation states of this alert message is provided by the AMC facilitator to the originator.

When the recipient's availability state changes from "unavailable" to "available" during an active watch availability period, the facilitator generates and transfers a Notification of Availability State Change alert message (AC-3b) to the originator when the recipient becomes available. FIG. 20 is a template of the Notification of Availability State Change alert message (AC-3b), under an embodiment. This alert message notifies the originator that the intended recipient's availability state is now "available" and offers options to contact the recipient. This alert message provides the originator with response options that include a mechanism for initiating a mobile call to the recipient, an option to re-send the Active Call Request, and an option to delete the alert message. Actions by the originator including initiating the mobile call and initiating re-transmission of the Active Call Request result in automatic deletion of this alert message from the originator's inbox, but the embodiment is not so limited. Additionally, information of delivery confirmation states of this alert message is provided by the facilitator to the recipient.

The AMC system of an embodiment also provides a store and forward voice messaging service that is referred to as voice Instant Messaging (IM) (voice IM). Use of the voice IM includes, for example, one-way messages that do not necessitate a response. The voice IM alleviates the user from arduous typing of text messages on mobile handsets.

Voice IM messages of an embodiment are delivered depending on a recipient's availability state and the communication modes enabled by the recipient on his/her handset, as described above, but are not so limited. These availability states and communication modes include, for example, receiver not connected, receiver not available, receiver available and public address (PA) communications mode (e.g., external speaker or speakerphone) enabled, and receiver available and PA communications mode disabled. Each of these scenarios is described in turn.

When a voice IM is sent to a recipient whose handset is not connected to a communication network, the facilitator stores the voice IM alert and forwards it when the recipient becomes reachable, subject to expiration. The AMC system uses normal delivery confirmation states to keep the originator informed of progress and reports delivery failure if the recipient does not connect to the network before the voice IM alert expires.

When a voice IM is sent to a recipient that is not available, the facilitator sends the voice IM alert to the intended recipient's handset(s) subject to the notification behavior for the handset's active availability profile. The recipient can access the voice IM through the alert's detail view. The originator is informed through his/her outbox that the voice IM (request) has expired if the recipient does not listen to the voice IM before it expires.

When a voice IM is sent to a recipient that is available and has the PA communications mode enabled, the facilitator sends the voice IM alert to the recipient's handset, where the handset sounds an audible notifying the recipient of an incoming voice IM, which is immediately played over the handset speaker. The recipient can access the alert detail to replay the voice IM.

When a voice IM is sent to a recipient that is available and has the PA communications mode of his/her handset disabled, the facilitator sends a voice IM alert to the receiver, subject to the notification enabled through the currently active Availability Profile. The recipient can listen to the voice IM from the alert detail view. The originator is informed through his outbox that the voice IM (request) has expired if the recipient does not listen to the voice IM before it expires.

FIG. 21 is a flow diagram for sending a voice IM to a recipient that is available and has the PA communications mode of a handset enabled (VM-1), under an embodiment. Generation of the voice IM begins when an originator selects one or more contacts as intended recipients and initiates a voice IM request to the contact(s) using the originator's handset. The voice IM request provides the originator with various options to tailor the request to his/her unique situation and to provide more context to the recipient. For example, the voice IM request is initiated from a phonebook of the originator's handset using at least one of any contact, group, and ad-hoc group. The phonebook includes the AMC Active Phonebook as well as other phonebooks of the originator's handset like the AMC Phonebook and the native phonebook of the handset. The voice IM request supports selection of a priority for the request, the priority including one of normal (lowest priority), important, and critical (highest priority). Further, the originator can specify/input an expiration time as a time period after which the voice IM automatically expires.

Upon receipt of the voice IM request from the originator's handset, the facilitator processes the voice IM request and in response forwards an alert message to a handset of the selected contact(s), where the alert message is referred to herein as a Notification of Voice IM Request alert message (VM-1a). FIG. 22 is a template of the Notification of Voice IM Request alert message (VM-1a), under an embodiment. This alert message is sent to the recipients of a voice IM request to inform the recipients that they have received a voice IM, and provides convenient options for responding to the request. This alert message provides an interface to listen to the voice message, and when the recipient has the PA mode enabled on his/her handset, the voice IM is immediately played over the handset speaker.

The Notification of Voice IM Request alert message (VM-1a) supports a number of response options by the recipient including initiating the mobile call to the originator using the value in the originator's phone number field of the alert message, initiating a voice IM to the originator, and deleting the request. Actions by the recipient including initiating the mobile phone call and initiating a voice IM to the originator result in automatic deletion of the alert message from the recipient's inbox, but the embodiment is not so limited. Further, information of delivery confirmation states of the Notification of Voice IM Request alert message (VM-1a) is provided by the facilitator to the originator.

FIG. 23 is a flow diagram for sending a voice IM to a receiver that is available and has the PA communications mode of a handset disabled (VM-2), under an embodiment. Generation of the voice IM begins when an originator selects one or more contacts as intended message recipients and initiates a voice IM request to the contact(s) using the originator's handset, as described above with reference to FIG. 21. Upon receipt of the voice IM request from the originator's handset, the facilitator processes the voice IM request and in response forwards the Notification of Voice IM Request alert message (VM-1a) to a handset of the selected contact, as described above with reference to FIG. 22. This alert message (VM-1a) provides an interface to listen to the voice message, and when the recipient has the PA mode disabled on his/her handset, the voice IM is played over the earpiece upon request by the recipient.

The AMC system of an embodiment supports active calling and messaging between subscribers and non-subscribers of services of the AMC system. While all features of the AMC system described above may not be available for calling/messaging when one of the parties is a non-subscriber or has a handset that does not include an AMC client, subsets of the features are supported as described below.

As an example, the AMC system of an embodiment supports the provision of message services to a recipient/subscriber (having a handset that includes an AMC client) from an originator/non-subscriber (handset does not include AMC client or user does not subscribe to AMC services). The Allow List and Block List filtering described above is supported on the recipient's (subscriber) handset for use in filtering calls from non-subscriber originators. Further, if the incoming call is missed by the recipient (subscriber), the facilitator processes the call request and in response forwards an alert message to a handset of the recipient (subscriber), where the alert message is referred to herein as a Notification of Missed Call from Non-Subscriber alert message (NO-1a).

FIG. 24 is a template of the Notification of Missed Call from Non-Subscriber alert message (NO-1a), under an embodiment. This alert message supports a number of response options by the recipient (subscriber) including initiating a mobile call to the originator (non-subscriber) using the value in the phone number field of the alert message, adding the originator's (non-subscriber) phone number to the AMC phonebook, responding with a text message, and deleting the request. Actions by the recipient (subscriber) including initiating the mobile phone call result in automatic deletion of the alert message from the recipient's device, but the embodiment is not so limited.

When the recipient (subscriber) selects the response option to respond to the missed call with a text message, the recipient (subscriber) is provided with a message template on his/her handset. The message template includes a subject area, a message area, and an area for the recipient's phone number. The message template supports user keying of text subjects and the recipient's phone number. Further, the AMC client generates and supports selection of pre-defined text subjects by the user.

Once generated, the response text message is transferred from the recipient's (subscriber) handset to the call originator by repackaging the contents of the response message into an SMS message directed at the mobile phone number of the call originator (non-subscriber). Delivery confirmation states of the SMS message are provided to the recipient (subscriber), and these states include at least one of "Not Sent", "In Transit", "Delivered", and "Delivery Failed". FIG. 25 is a template of the Response to Missed Call from Non-Subscriber alert message (NO-1b), under an embodiment.

In addition to providing message services to a recipient/subscriber from an originator/non-subscriber described above, the AMC system also supports an originator/subscriber calling/messaging a recipient/non-subscriber. The AMC system upon initiation of an Active Call Request by an originator (subscriber) to a recipient (non-subscriber) provides the originator various options to tailor the request to his/her unique situation and to provide more context to the recipient (non-subscriber). Active Call Requests to non-subscribers support numerous input options including priority, text subject, originator's phone number, and expiration time to name a few.

The priority input option allows the originator (subscriber) to select one of Normal, Important, and Critical priorities. The Normal priority is the lowest level and the Critical priority is the highest level, but the embodiment is not so limited.

The text subject input option allows the originator (subscriber) to key a text subject tag. An embodiment supports selection of pre-defined text subjects, and the portal supports definition of the pre-defined text subjects.

The originator's (subscriber) phone number input option supports originator (subscriber) keying of phone numbers and embedding of these phone numbers in the request alert.

The default number is the originator's (subscriber) mobile phone number. The expiration time input option allows the originator (subscriber) to input an expiration time value at the handset to specify a time period after which the Active Call Request automatically expires.

Once generated, the active call request to the recipient (non-subscriber) is transferred to the originator's (subscriber) handset by the AMC system. The AMC system repackages contents of the Active Call Request into an SMS message directed at the mobile phone number of the recipient (non-subscriber). As one example, the SMS message is as follows: "<Originator name> at <phone number> is requesting to speak with you before <local expiration time>. <Priority>". Delivery confirmation states of the call request SMS message are provided to the originator (subscriber), and these states include at least one of "Not Sent", "In Transit", "Delivered", and "Delivery Failed". FIG. 26 is a template of the Active Call Request to a Non-Subscriber (ON-1a), under an embodiment.

The AMC system components including the AMC client and the facilitator, in allowing users of handsets to quickly coordinate conversations, screen unwanted calls and interruptions and access enterprise directories, use alerts to notify users when someone is urgently trying to contact them and provide various options to the user for responding to the caller. The alerts notify users of important events such as, for example, an incoming Active Call request, expiration of a postponement period, or failure of a call request. Incoming alerts of an embodiment can be accompanied by one or more audible notifications, some of which vary according to alert type.

The alerts of an embodiment support numerous data fields. The data fields include a time/date stamp indicating when the alert was created along with data fields for Read/Not Read indications, Responded to/Not responded to indications.

Regarding the Read/Not Read indication, the alerts are received in the "not read" state. The alert changes to "read" if its detail view is opened. The alert also changes to "read" if the user invokes one of the alert's response options from an Alert Summary view of a UI on the user's handset, including initiation of a mobile call.

Regarding the Responded to/Not Responded to indication, alerts are received in the "not responded to" state. The state changes to "responded to" if the user invokes one of the alert's response options from the Alert Summary view, or the Detail view (UI), including initiation of a mobile call.

The alerts include numerous message types including informational, request, response, and reminder. The information message is sent by the facilitator. The request message is a user initiated message or call request. The response message is a user response to a call request or message. The reminder message is an informational message associated with a previously scheduled or time-related event, sent by the AMC system.

The AMC client of an embodiment, when running in the foreground of the handset, will interrupt the user presentation upon receipt of an incoming alert. When the AMC client is running in the background, the AMC client wakes and displays the Alert Summary view.

A message in the "Delivery failed" state provides a response option to resend the message, selection of which uses the previously input values for priority, text subject, and voice subject as the defaults, and a new creation time.

A message in the "Request expired" state provides a response option to resend the message or an option to "watch availability" the message recipient. Selection of the resend option results in resending the message using the previously input values for priority, text subject, and voice subject as the defaults, and a new creation time.

In addition to dynamically managing how and when mobile calls take place and intelligently screening calls based on numerous factors described above, the components of the AMC system also improve efficiency of voice communications by increasing accessibility of enterprise and personal contact information from mobile phones. This contact information is managed by providing the user with access to a contact list and a number of phonebooks via the handset.

The contact list of a handset with an AMC client includes contacts in both an AMC Phonebook and an AMC Active Phonebook, but is not so limited. The handset contact list is the launching point for AMC system calling features such as Active Calling described above. The AMC Active Phonebook includes contacts of the AMC Phonebook that are AMC system subscribers (referred to as AMC contacts), but is not so limited. The Active Phonebook provides additional functionality over the native handset phonebook. Contacts are displayed alphabetically by name in the Active Phonebook along with an icon that shows the AMC context information for the contact (e.g., availability, accessible communication modes) as described above. The AMC client of a handset notifies the facilitator when the corresponding availability profile is changed, and the Active Phonebook provides additional convenience functions for initiating AMC calling features.

Each user can select the contents of their Active Phonebook through the portal. The Active Phonebook provides the ability to view and modify AMC contacts as well as to select one or more contacts from the contact list and then select desired AMC calling features for the selected contacts. The Active Phonebook provides graphical indications of the availability state (i.e., contextual cues) of each AMC contact as defined by the currently active availability profile of that contact. The AMC system updates the context data in the Active Phonebook when any subscriber represented in the list changes his availability state, where the updates of an embodiment occur the next time the AMC client and facilitator communicate following the change in availability state. The Active Phonebook also provides the user with a manual refresh capability at the handset to refresh all context data in the Active Phonebook. Additionally, the Active Phonebook provides indications when context data for a contact in the Active Phonebook is stale, where the time period after which the data becomes stale is configurable by the user.

The contact information of the AMC Phonebook is stored in a memory area of the handset that includes the handset native phonebook, but can be stored in other memory areas of/available to the handset. Contact information can be imported into the AMC Phonebook from the native phonebook. Addition, modification, and deletion of contacts in the AMC Phonebook reflect in the native phonebook of the handset. Likewise, addition, modification, and deletion of contacts in the handset's native phonebook are reflected in the AMC Phonebook.

Components of the AMC system of an embodiment support aggregation and management of contact information from various sources including, but not limited to, directories resident on desktop computers, corporate/enterprise directories, and contact information of the handset native phonebook, and provide data coupling between those sources and mobile handsets hosting the AMC client. In this manner, the AMC system automatically provides a user with access to accurate real-time contact information at his/her handset without the need for manually loading the information into the handset native phonebook. As an example, with reference to FIG. 5 and FIG. 6, corporate/enterprise directory information is pushed to the facilitator, but the AMC system of alternative embodiments may receive the corporate/enterprise directory information via any number of methods known in the art. Due to limited processing resources on the handsets, however, not all contact data may be stored on the handsets. The AMC system provides convenient search and retrieve features from the handset to facilitate easy lookup of personal or corporate directory information, as described below.

Access to the aggregated contact information by a user of the AMC system is supported by the AMC client via search queries directed at all directory information to which the AMC system has access. The search queries are based on various combinations of name, including last name, first name, and partial name. Alternatively, rather than supplying the first few letters of the name into a field for a name-based search, the user may access an alphabetical display that accesses records corresponding with the first letter of the first or last name. Other search criteria including department, location/facility, region, and group affiliation (i.e. information assigned by a system administrator such as West Coast Sales Team, Account Team, Escalation Support Team, etc.) to name a few, are available with the search criteria. This information is intended to assist in the search for the appropriate contact, but completion of the fields is optional for any given search.

Upon completion of a search, components of the AMC system forward the results of the search to the user's handset for display, where the AMC system responds with search results that approximate the initial query as best as possible. Along with user name, other relevant details/cues are provided with each record to assist the user in identifying the appropriate contact. Examples of this include but are not limited to: department, city/facility, and group affiliation. Preferences for this additional information are configured using the portal, described above with reference to FIG. 1. When a search results in multiple names fitting the search criteria, then the user has the ability to scroll and select the correct entry using the navigation keys.

The portal of an embodiment includes a browser-based search interface for use by the user when logged in to the portal during configuration and maintenance. Example uses of the portal search interface include adding/deleting Active Phonebook contacts, identifying group affiliation, etc. The portal also supports easy selection of contacts from both personal phonebooks and corporate phonebooks to make these contacts available via the handset. The portal also allows the user to designate contacts from both personal phonebooks and corporate phonebooks as Active Phonebook entries that may appear in a priority order on the phone contact list.

Components of the AMC system support integration with numerous personal contact managers, for example Microsoft Outlook, Lotus Notes, and ACT to name a few. From a handset perspective, an end user has access to personal contact information (e.g., handset phonebook entries, desktop contact list in Outlook, etc.) as well as corporate contact information. The user can manage all of these contact databases as separate phonebooks rather than attempt to integrate them into one database.

The AMC system of an embodiment supports user-initiated information transfers (uploads and downloads) between contact managers and the facilitator. Further, the AMC system of an embodiment supports user-initiated information transfers (uploads and downloads) between the AMC client and the facilitator. The facilitator resolves duplicates and any discrepancies when new contacts are input to the facilitator from either a personal contact manager or the AMC client.

The AMC system of an embodiment further supports user creation, modification, and deletion of AMC subscriber groups (or consolidated contacts) as a permission-based feature via the portal, but is not so limited. Therefore, any user with permission can create groups. An individual creating a group is considered the sole owner of the group and the only person able to modify the group. The group owner as well as a system administrator can delete groups. Groups are viewed using either of the portal or a handset that includes an AMC client. Subscribers can upload group definitions to AMC handsets for use in Active Phonebooks and the general contact list, just like ordinary contacts (including but not limited to Active Calls, Watch Availability, and conferencing). The groups can be included in Block/Allow Filter lists, and filtering in this case is performed against the individuals in the groups, not the whole group.

The AMC system components of an embodiment provide a UI for use in accessing functions of the AMC system, as described above. The UI of an embodiment is a component of an AMC client embodiment that includes multiple display screens on a mobile device, but the AMC client is not limited to mobile devices.

Figure 27:
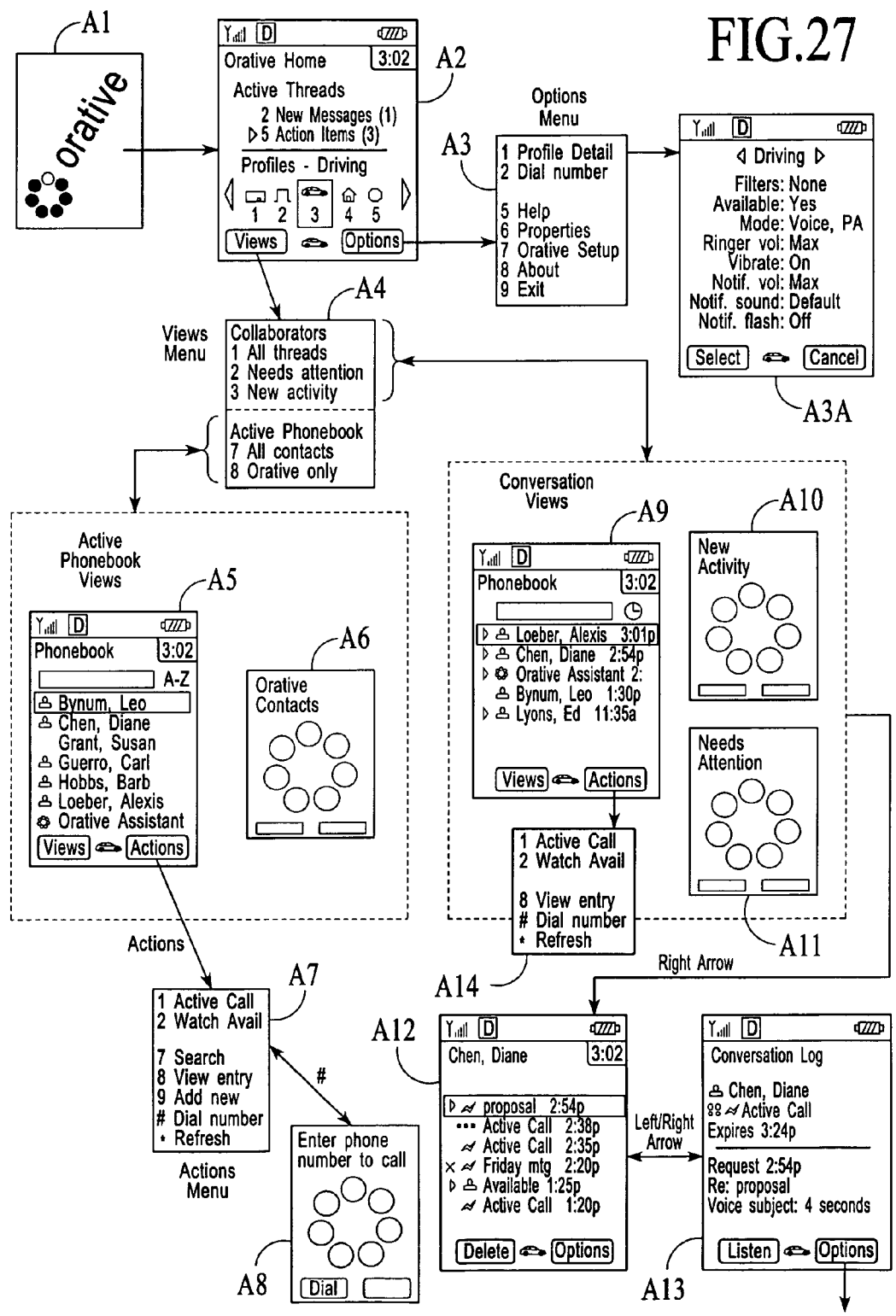
FIG. 27 is an overview of a user interface tree of a user interface, under an embodiment.

FIG. 27 is an overview of a user interface tree, under an embodiment. Each of the blocks shown indicates what is seen on a mobile device screen, such as a cellular telephone handset screen. For convenience, each of the blocks will be referred to as a screen or a menu, as appropriate.

Screen A1 is a splash welcome screen, and is the first screen a user sees when starting the AMC client according to the embodiment. The splash welcome screen is shown for a brief time period and displays basic information about the AMC client, such as the version or build number, and copyright information.

Screen A2 is a home screen. Screen A2 is thus the main screen, or home base, for the AMC client. Screen A2 provides summary information about the user's conversations, and notifies the user about new conversation requests from other users. It provides the means to quickly select an availability profile setting. Handset profiles determine handset behavior when calls and alerts arrive. Profiles also specify a user's availability state, which is communicated to other users through their respective Active Phonebook views.

A detailed list of the availability profile attributes for the currently selected profile (on screen A2) is accessible from the Options menu that is shown as screen A 3. The home screen A2 further provides an entry point to the other screens in the AMC client, such as Active Phonebook views (screens A5, A6, A7 and A8), Collaboration views (screens A9, A10, A11, A12 and A13), and Settings screens. These various screens are illustrated and described further below.

The home screen A2 includes conversation Summary information, showing active threads, such as new messages and action items. The home screen A2 also shows a Profile selector that, in the mode shown, displays icons to represent available Profiles. The home screen A2 also shows an Active Profile indicator showing the currently selected Profile. The home screen A2 also shows Views and Options buttons which will be described further below.

The conversation summary region displays a count of the new, unread conversations received by the user including: New Active call requests; Reminder message for postponement period complete; and Result of Watch Availability requests.

The conversation summary region also displays: a count of the new, unread conversations received by the user (as defined above) that are above 'normal' priority, displayed in red font color; a count of the conversations in which it is the user's turn to respond; and a count of the conversations in which it is the user's turn to respond (as defined above) that are above 'normal' priority, displayed in red font color.

The conversation summary data is updated whenever new messages are received by the AMC client that impact the summary values displayed.

A profile selection wheel is also provided. The selection wheel is analogous to a slot machine. The wheel contains an icon list representing the user's predefined profiles and the associated shortcut keys. As the user clicks the left and right arrow keys, the wheel advances one position per click, left or right, behind the selection window. The profile that appears in the selection window is considered to be the selected profile. No further action is required by the user to select a profile. The profile selection widget supports up to ten (10) profiles in one embodiment. Shortcut keys for profile selection are also supported, where the first profile in the list is associated with keypad number "1", the 2nd associated with keypad number "2", and so on through "0".

When a new profile is selected, the following occurs in an embodiment, for example: a facilitator is notified of the newly selected profile; the user's availability watchers (via Active Phonebooks) are notified of a new availability state; Active profile indicators are updated on all screens that include it, to match the currently selected profile; and Availability profile detail text/graphics are updated to reflect the selected profile.

Screens of an embodiment include a graphical indication of the currently selected availability profile using the icon associated with the profile. The Profile Detail screen A3A shows the attribute values for the selected Handset Availability Profile. Using the left and right arrow keys the user can easily scroll through the list of profiles, and select or activate the displayed profile using the left soft key. This selection method is an alternative to the profile selection widget on the home screen.

The Active Phonebook is used to store contact information and initiate mobile phone calls using enhancements of the AMC client. The handset client application builds on includes contextual cues in the Active Phonebook display that give an indication of each user's willingness and ability to communicate. Within the community of users, a user's willingness and ability to received communication corresponds to their currently selected Handset Availability Profile. Because human behavior and network responsiveness are not 100% reliable, the availability cues may become stale over time. When the cues become stale, a clock symbol is overlaid on the regular availability icons. Non-user contacts do not have an icon next to them.

The Active Phonebook listing consists of contact entries, where each entry defines multiple phone numbers. Users are responsible for providing the phone numbers, but AMC system administration incorporates the phone numbers already defined in the handset's native phonebook when possible. The user designates one number per entry as the default for use with the dialing features supplied with the AMC client. For example, when an entry is selected on the Active Phonebook screen and the user presses send, the entry's default number is dialed. In addition to initiating mobile phone calls, the Active Phonebook allows users to initiate the various AMC client calling features such as Active Call. The Active Phonebook always has at least one entry called the "AMC Assistant", which the AMC system uses to communicate important messages and other information to the user.

Each entry provides storage for one to seven phone numbers in one embodiment. Alternative embodiments can provide any number of numbers per entry.

Each phone number in the contact entry is labeled from the following set, which is not meant to be exclusive: Phone number—Mobile 1; Phone number—Mobile 2; Phone number—Office 1; Phone number—Office 2; Phone number—Home 1; Phone number—Home 2; and Phone number—Miscellaneous.

The user selects which label during the "add new" contact process. Associated with each contact entry number label is an icon for use on a Phonebook Entry Detail screen (not shown).

The following contact list filters and sort orders are supported, and can be selected from the 'views' menu of the Active Phonebook screen A5: (i) all contacts on the handset, sorted in ascending alphabetic order, names beginning with 'a' at the top; (ii) user contacts only, sorted in ascending alphabetic order, names beginning with 'a' at the top; and (iii) sort contact entries in order of most frequently called (at the top), least frequently called at the bottom; frequency count means total number of calls placed to any phone number associated with a contact entry; in case of a tie between one or more contact entries, sort the tied entries in ascending alphabetical order. All other phonebook behavior is the same regardless of the filter selected.

Another navigation feature is fast lookup using entry of alphabetic search criteria. For example, in one embodiment, alphabetic search criteria are entered (via Multi-tap or various other input/output devices and/or applications) corresponding to the first three letters of the contact name field; searches using one, two, or three characters are supported. No more than three search characters are supported in one embodiment. As each search character is entered, the contact list is filtered such that only those contact entries with the leftmost characters matching the search criteria appear in the list; the selection bar is positioned over the first contact in the filtered list. For example, if the "5" key is pressed, the contact list is reduced to only those entries that begin with the letter "J", and the selection bar is positioned over the first entry beginning with the letter "J"; if "5" is pressed twice in rapid succession, the list is reduced to entries starting with the letter "K" and the selection bar is positioned over the first entry beginning with the letter "K. A short pause between key presses indicates letter entry for the next position in the search criteria. For example, the key presses "J"-short pause-"K" would reduce the list to entries that begin with "Jk". If no entries match the search criteria then nothing will be displayed.

A Views menu A4 allows the user to change views. The Views menu A4 is used to navigate to either alternate views of the Active Phonebook, or alternate views of the Collaboration, or Conversation screens.

An Actions menu A7 allows the user to initiate an action against one or more contacts or groups in the Active Phonebook (eg. Active Call), and manage phonebook entries including viewing, editing or adding new entries, and initiating a directory search.

One embodiment includes the following menu item preconditions: (i) Menu item number 1 (Active call), requires the user to select one or more contacts (or groups) first; (ii) Menu item number 2 (Watch availability), requires the user to select one or more user contacts (or groups) first; and (iii) Menu item number 8 (View entry), requires the user to select one and only one contact (or group) first.

The user selection is irrelevant for all other menu items. In one embodiment, Active Call request may be initiated against both user and non-user contacts, whereas Watch Availability request may only be initiated against user contacts.

Figure 28:
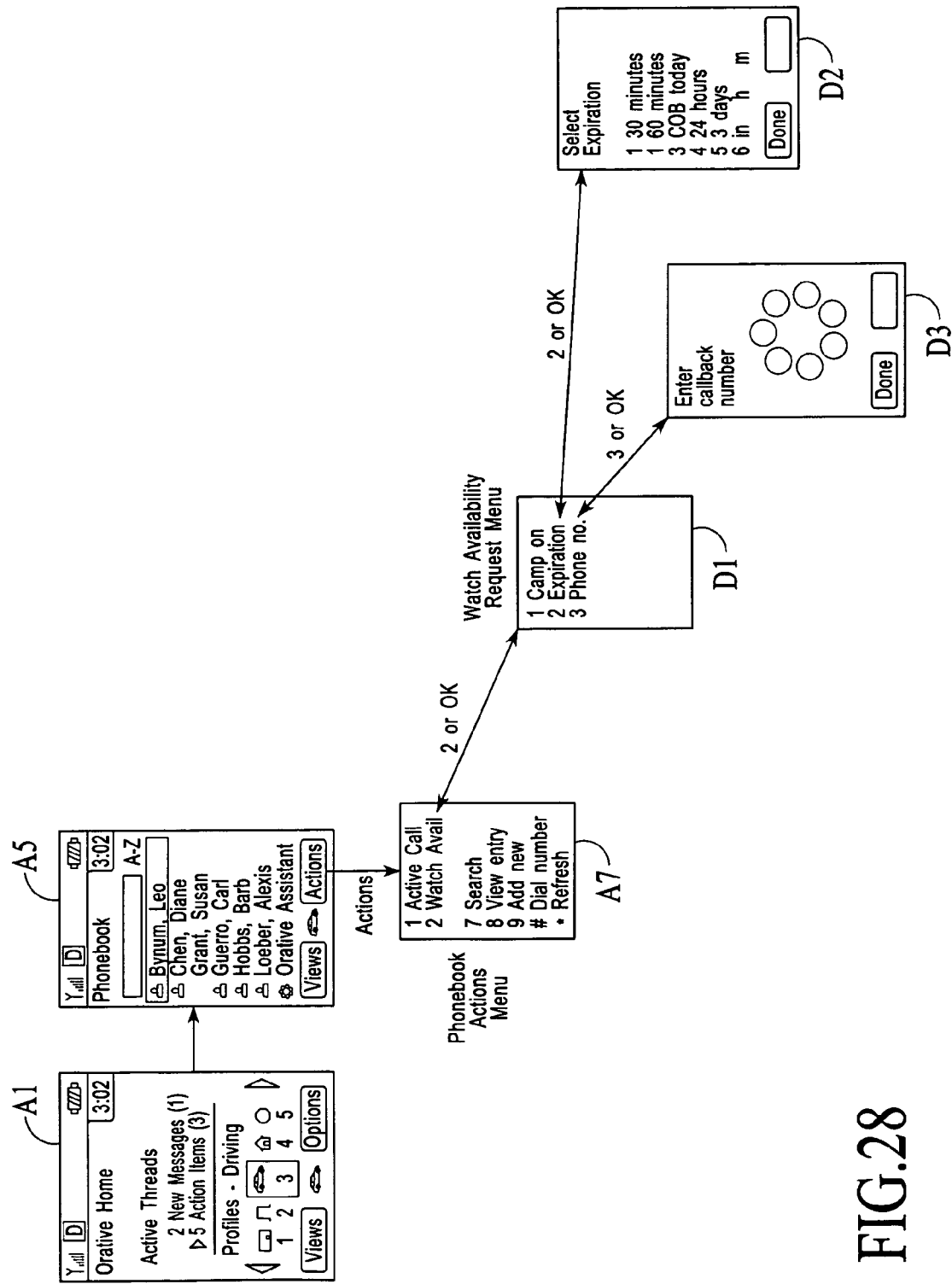
FIG. 28 is an overview of a Watch Availability Request view or screen tree of a user interface, under an embodiment.

FIG. 28 is an overview of a Watch Availability Request view or screen tree for the Watch Availability menu item 2 of Action menu A7. A Watch Availability Request menu D1 is shown. This menu allows the user to initiate a Watch Availability request, and enter user defined values for the request expiration using screen D2, and callback phone number using screen D3.

Figure 29:
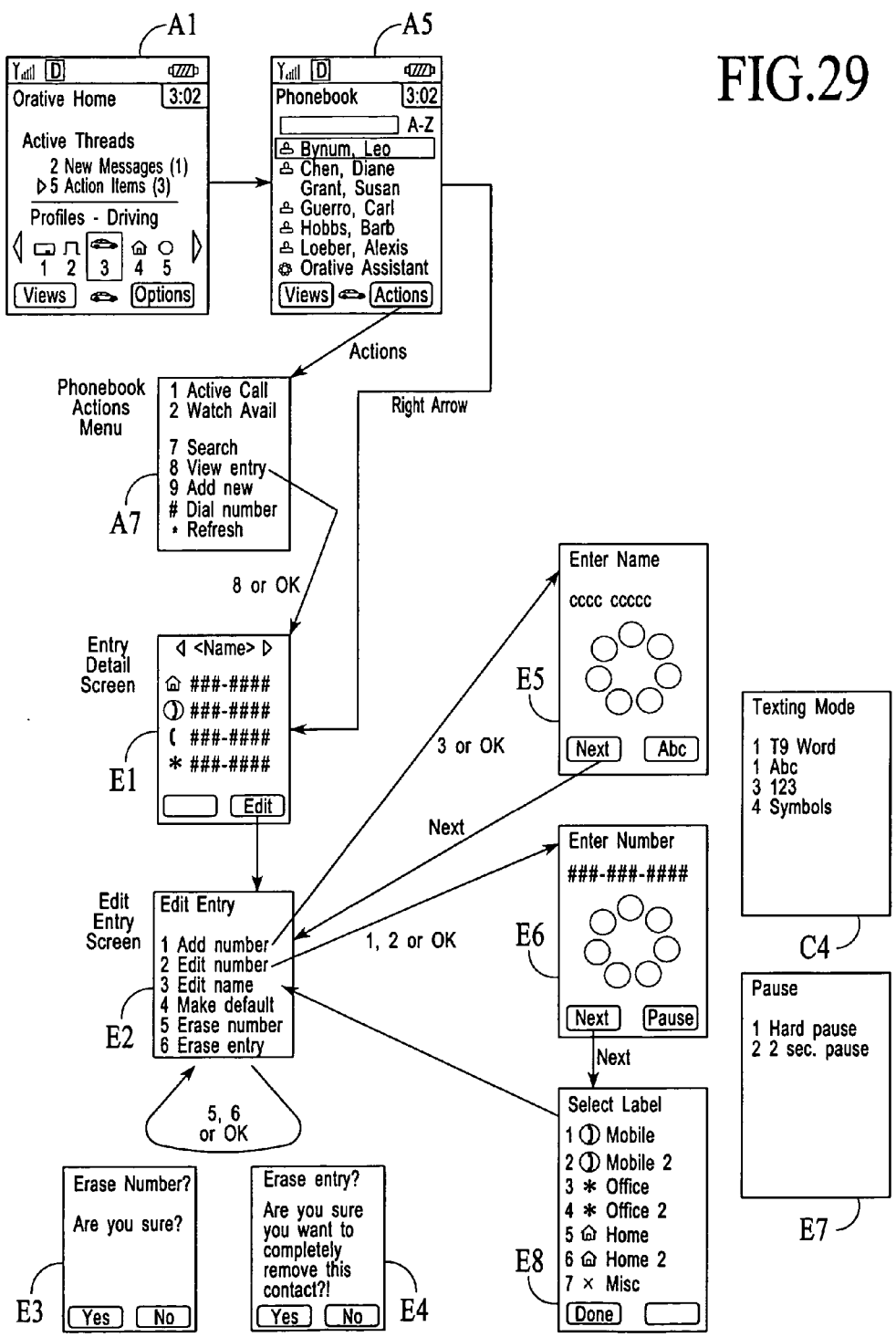
FIG. 29 is an overview of a phonebook View Entry tree of a user interface, under an embodiment.

FIG. 29 is an overview of a phonebook View Entry tree for the View Entry menu item 8 of Actions menu A7. An Entry Detail screen E1 displays detailed information about an Active Phonebook entry. Specifically, it shows the contact's name, and the list of phone numbers stored with the phonebook entry. It also provides access to the editing screens, which allow users to modify or erase the phone numbers associated with the phonebook entry.

An Edit Entry screen E2 provides a list of user options to modify or erase a phonebook entry. Also provided is a way for the user to designate which phone number in the entry is the default number for use with calling features supplied with the AMC client, such as embedded in an Active Call.

An Erase Number Confirmation Dialog screen E3 provides dialog to verify that the user is sure they want to delete a phonebook entry number before actually deleting it.

An Erase Entry Confirmation Dialog screen E4 provides dialog to verify that the user is sure they want to delete an entire phonebook entry before actually deleting it.

A Phonebook Enter Name screen A5 allows users to enter a person's name for a phonebook entry. Users can select from various text input methods such as Multi-tap or T9 (using Texting Mode menu C4), and can enter character symbols if desired.

A Phonebook Enter Number screen E6 allows the user to add a phone number to a phonebook entry. Text entry is limited to numerals using the number keys on the handset. The user can enter pauses in the phone number if required. After entering the number the user is transferred to a screen where they can designate a label (eg. mobile, home) for the number to distinguish it from the other phone numbers stored in the phonebook entry.

A Phone Number Pause menu E7 allows the user to add a dialing pause to a phone number to accommodate voice mail systems or credit card dialing. A hard pause pauses the handset dialer until the user presses the Left Soft Key. A two second pause pauses the dialer two seconds and then resumes dialing.

A Phonebook Select Label screen E8 allows the user to designate which phone number slot to store a phone number in. A graphical icon is associated with each phone number slot to help the user rapidly identify the phone number of interest on the Phonebook Entry Detail screen E2.

Figure 30:
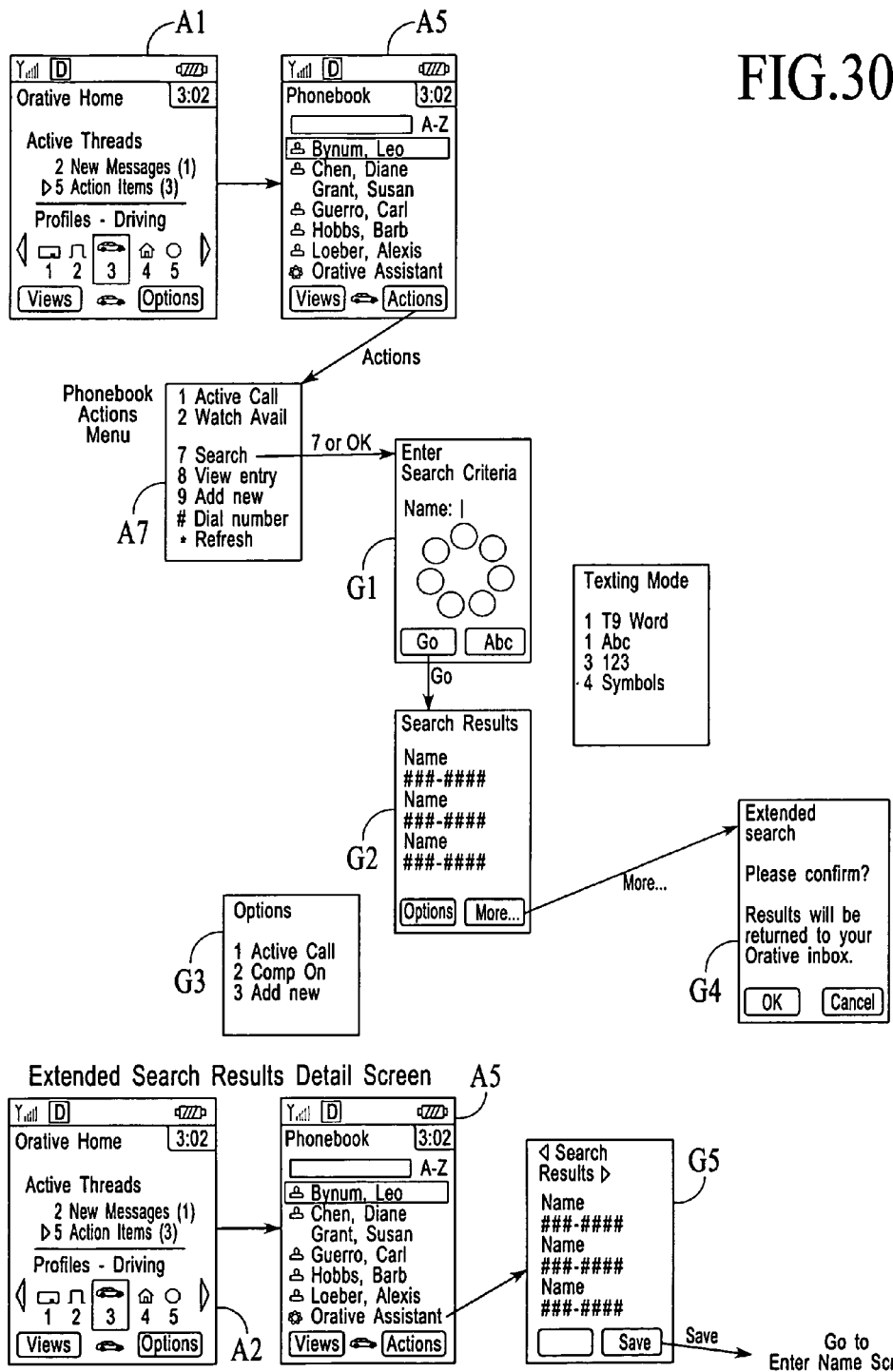
FIG. 30 is an overview of a directory Search View tree of a user interface, under an embodiment.

FIG. 30 is an overview of a directory Search View tree for the Search Entry menu item 7 of Actions menu A7. A directory Search Criteria screen G1 provides input fields to enter contact directory search criteria that will be submitted to the facilitator. In one embodiment, the search feature is a two step process; this screen initiates a search against the handset phonebook and the facilitator directories. The results of this search are immediately returned to the user. If the user didn't find the contact they were looking for, they can initiate an extended search which instructs the facilitator to search the various contact directories it is connected to in the enterprise (see for example, FIGS. 5 and 6). In one embodiment, the search criteria include a text string that is matched against the contact name field in the contact directories. Various text entry modes are supported. The search results are returned to the user via the handset user interface.

A search results Options menu G3 provides options the user can initiate against one or more contacts from the local Search Results screen G2. In one embodiment, the following menu item preconditions are enforced: (i) Menu item number 1 (Active call), requires the user to select one or more contacts (or groups) first; (ii) Menu item number 2 (Watch Availability), requires the user to select one or more user contacts (or groups) first; and (iii) Menu item number 3 (Add new), requires the user to select one and only one contact first.

An Extended Search Confirmation screen G4 provides a dialog that asks for user confirmation before initiating an extended directory search. The search criteria were previously entered on the Directory Search Criteria screen. Since it may take a short while to complete the extended search, the results are returned to the use via an AMC alert and appear in the user's inbox. An Extended Search Results screen G5 illustrates a case in which multiple matching entries were found.

Referring again to FIG. 27, a series of collaboration, or Conversation screens (such as screen A9) help users monitor and manage all the conversations they engage in with the people in their phonebook. A "conversation" as referred to herein encompasses all forms of textual and verbal communication media, including but not limited to Active Calls, voice messaging, text messaging, and conference calling. The AMC client helps users keep track of all the conversations they are engaged in and provides convenient reminders and alerts when it is their turn to respond.

A Conversation screen A9 functions similarly to the Active Phonebook described above (e.g., name search, action invocation). However the view of the phonebook shown in FIG. 27 shows people with whom the user is currently engaged in conversation. Different filters are available for the Conversation screen A9 to further refine the list contents. The combination of icons, font style, and font color convey state information about the people and conversations. For example, bold font indicates a new correspondence has been received from the named person, and red text indicates one of high priority has been received. An availability state icon is displayed next to each user contact in a similar manner to the Active Phonebook views, or screens. In addition, an indicator is displayed next to each contact when the end user's attention is required. There is a visual cue indicating the named person is trying to contact the user and allowing further exploration to determine the urgency and purpose of the correspondence. A Conversations screen for each person provides the detailed information about each of the conversations the user is engaged in with the person. In most respects, the contacts shown on this display provide similar functionality as the Active Phonebook; the differences have to do with how the lists of contacts are displayed, the contents of the menus, and key mappings.

In one embodiment, the following contact list filters are supported: (i) contacts with which the user has at least one conversation in progress (eg. Active Call, Voice message, text message, watch availability); in this case the screen title is "All Conversations"; (ii) contacts with which the user has at least one conversation in progress, and it is the user's turn to act (eg. receipt of an Active Call request, or delayed call reminder); in this case the screen title is "My Turn to Act"; the attention icon can appear in the left most column, next to each contact; and (iii) contacts with which the user has at least one conversation in progress and new activity has occurred, and the new activity has not been read (e.g., receipt of an Active Call request, or response); in this case the screen title is "New Activity"; each contact name in this list can be displayed with bold font style. Contacts can be sorted in chronological order where the contact with the most recent activity appears at the top of the list, regardless of which filter is used.

A Conversations Action menu A14 allows the user to initiate an action against one or more contacts or groups in the Collaboration view (eg. Active Call), and view phonebook entries.

A Conversation screen A12 displays a list of the conversations in progress with a specific individual. The individual's name appears at the top of the screen. The user accesses this view from the Conversations screen A9. Next to each contact name are two columns of icons that give state information about the conversation in progress and the type of conversational media in use. Icons only appear in the left most column when the user's attention is required. Font color indicates priority, where red indicates high priority messages. Bold font indicates a new correspondence has been received, which the user may want to review. Ghosted, or light gray, font indicates the conversation thread has expired and has been designated for automatic cleanup.

The first display column shows one of the following three values (an icon should appear in this column only when the thread requires the attention of the user): an 'attention' icon in cases where it's the user's turn to act on the conversation (eg. user's turn to respond to an Active Call request); a 'failed to deliver' icon in cases where a break down in message traffic has occurred for the thread; and "blank" or no icon for all other cases.

The second display column shows an icon representing the media type of the conversation thread, or the ellipsis icon if the user has initiated a message that is waiting to be sent or in transit to the intended recipient. If a conversation transitions to a different media, this icon changes to reflect the new media. An example is when Active Call request is responded to with a voice message.

A Conversation Log screen A13 provides detailed information about a single conversation thread. It includes a running summary of message exchanges and other conversation activity for the life of the conversation.

Figure 31:
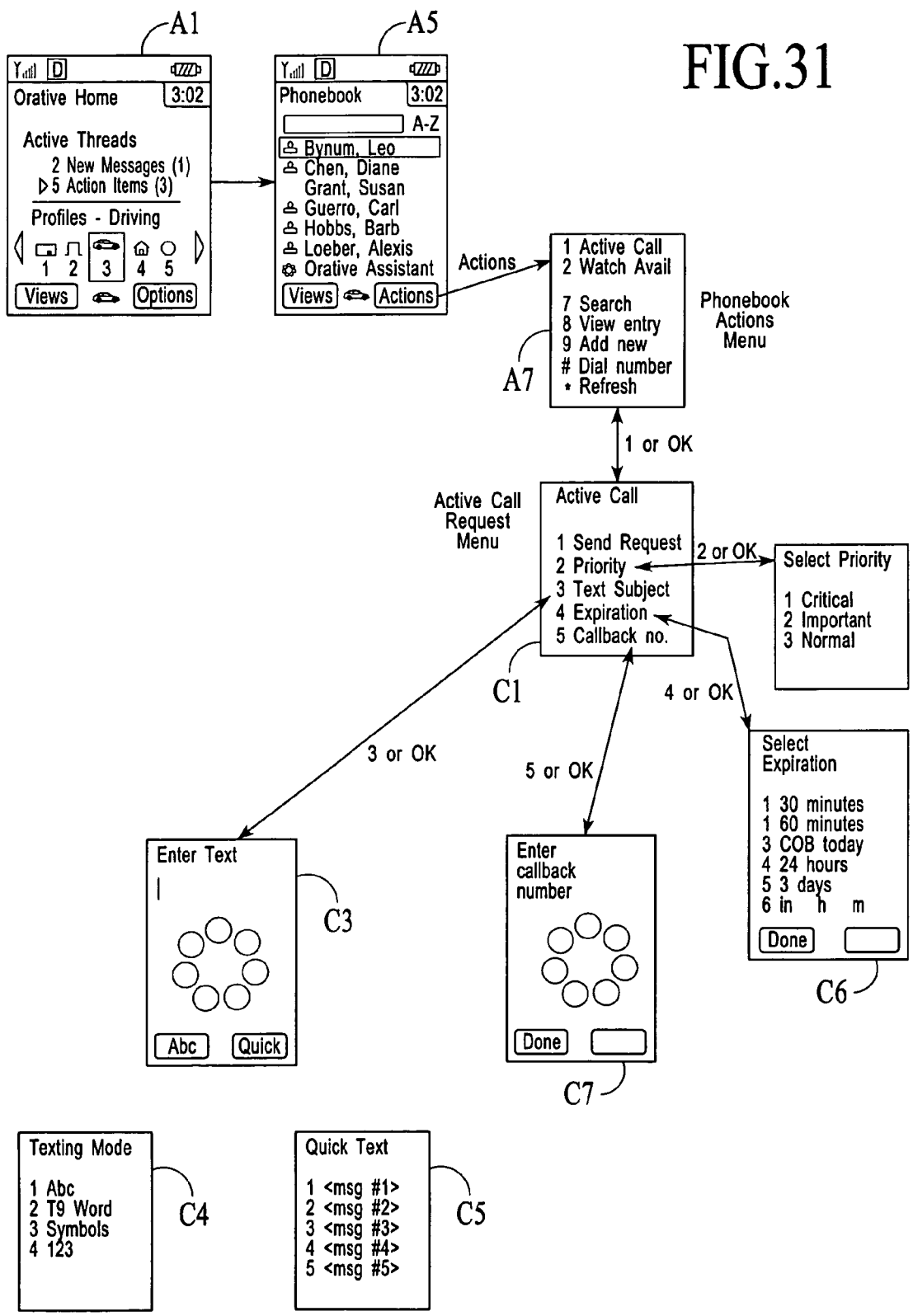
FIG. 31 is an Active Call Request view tree of a user interface, under an embodiment.

Referring to FIG. 31, an Active Call Request view tree is illustrated. An Active Call Request menu C1 allows the user to initiate an Active Call request and specify user defined values for the Active Call Request parameters.

A Select Priority menu C2 allows the user to designate the priority of the Active Call request.

A text Subject Entry screen C3 allows users to enter a short text message that is included with an Active Call request. Users can select from various text input methods such as Multi-tap or T9. Users can enter character symbols if desired. This screen also supports a menu of Quick Text that features a list of user defined messages for rapid text entry.

A Texting Mode menu C4 enables the user to select the type of text input mode they desire. Various modes are supported similar to those offered by a native mobile phone text input interface.

A Quick Text menu C5 allows the user to select from the default or user defined quick text strings. These text strings can be defined at the portal.

A Select Expiration screen C6 allows the user to select or enter an expiration time for their AMC client calling feature such as Active Call or Watch Availability. The user can select from predefined expiration values or enter a value of their choosing in hours and minutes. Selectable values also include convenient options that correlate to the typical models end users use to keep track of time (and deadlines). For instance, the close-of-business (COB) value corresponds to 5:00 pm.

A Callback Number Entry screen C7 allows the user to enter a phone number to be associated with an Active Call request. This number replaces the user's default mobile phone number. For example, the user may prefer that the Active Call recipient call them back on their desk phone instead of their mobile phone. When the recipient receives the call request they simply press Send to call the sender's desk phone number.

In one embodiment, the Actions menus A7 also includes a Select Delay menu (not shown) that allows the user to select or enter a time interval for delaying (or postponing) an Active Call request. The user can enter the time interval as either a duration value in hours and minutes, or as a wall clock time.

Regarding the handsets, while the AMC system permits an authorized user to connect to the AMC system over multiple devices/handsets, user login is limited to one device/handset at a time for security reasons. Authentication of the end user uses appropriate mechanisms to ensure the identity of the end user handset, where the mechanisms of an embodiment include a PIN that includes multiple characters combined with a unique identifier for the handset, and authentication.

The AMC system of an embodiment includes a protocol for use in transferring data between two endpoints, where the endpoints include two handsets, a handset and a facilitator, and two facilitators, where the handsets include an AMC client. The handset and facilitator described above with reference to FIG. 8 and FIG. 9 provide example embodiments of the endpoints, but the endpoints are not so limited. The protocol supports numerous types of data and multiple character sets and languages. Furthermore, the protocol is independent of the transport protocol and runs on top of numerous protocols including HTTP, TCP, UDP, SIP, and WAP, as described above.

Figure 32:
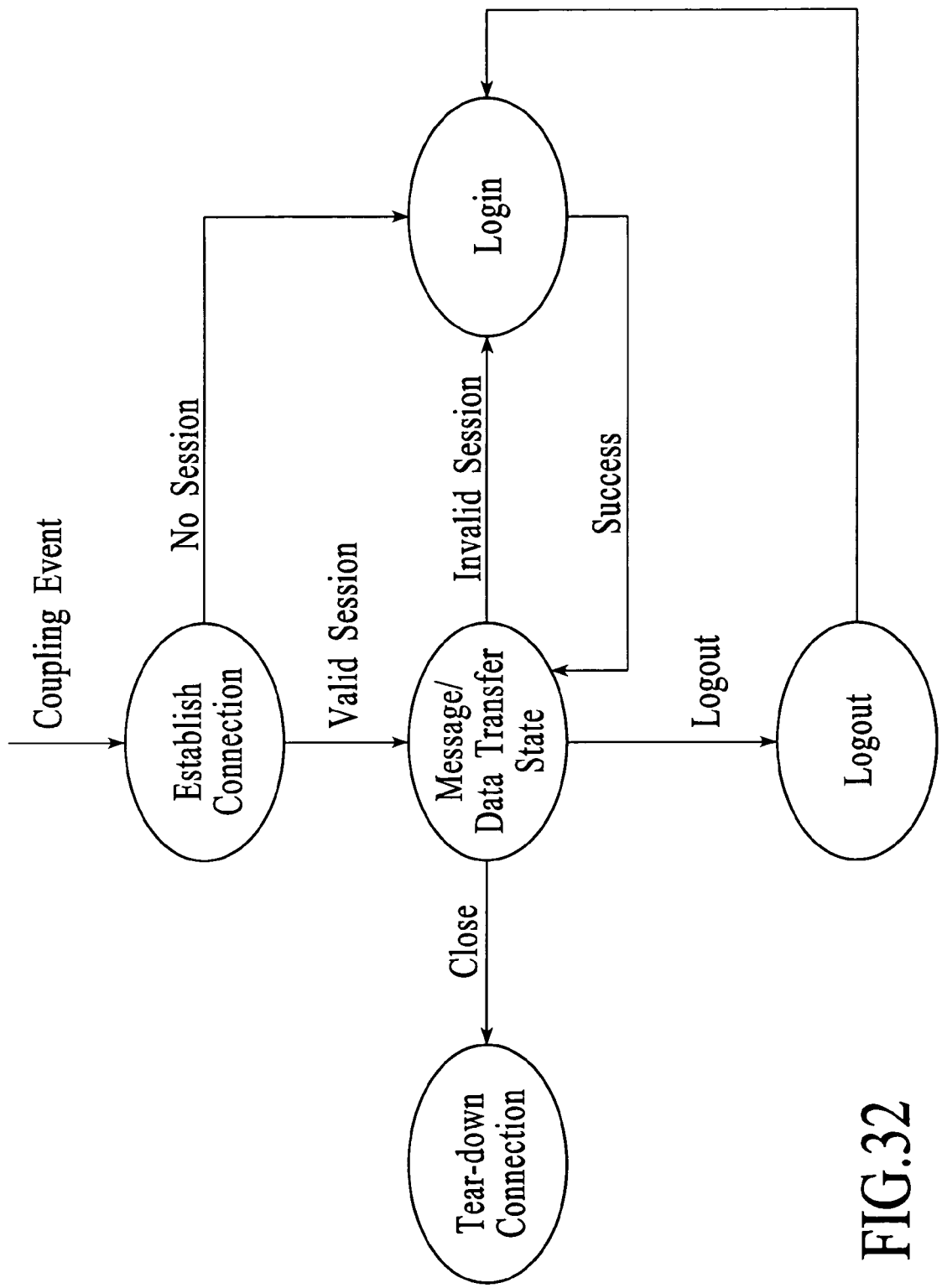
FIG. 32 is a state diagram of the protocol, under an embodiment.

FIG. 32 is a state diagram of the protocol, under an embodiment. The states of the protocol include connection establishment, login, data transfer, logout, and connection tear-down, but are not so limited. In the connection establishment state, a connection is established between two endpoints subsequent to a coupling event determined by a rate controller. A coupling event occurs when the rate controller in the AMC client or facilitator determines a set of criteria have been met for a connection to occur. The rate controller's primary role is to limit the number of times the AMC client connects to a facilitator over a wireless network, thus limiting wireless charges. The rate control criteria are per user and can be changed via the user portal.

In the login state, two endpoints mutually authenticate each other resulting in creation of a session. The login process of an embodiment is synchronous in that the AMC client waits for a reply from the facilitator before sending any additional messages. The login state of an embodiment includes two steps, capability negotiation and user authentication described in turn below.

Capability negotiation enables the two endpoints to determine capabilities. The AMC client-to-facilitator capability negotiation includes the AMC client transferring a message to the facilitator indicating the features the AMC client supports and the facilitator responding with a message as to whether the facilitator supports these same features. Facilitator-to-facilitator capability negotiation includes a first facilitator (source facilitator) that initiates a connection with a second facilitator (receiver facilitator), for example. The receiver facilitator responds to the message from the source facilitator with a message that includes the negotiated capabilities it supports, but is not so limited.

Authentication is the second step in the login state as described above. The authentication protocol is a function of the authentication mechanism used by the (receiver) facilitator. A basic authentication mechanism is for example one where the AMC client simply sends a username and password to the facilitator. A facilitator certificate authentication mechanism would be one where both endpoints supply valid certificates for authentication. A more complex authentication scheme may be one in which the AMC client sends a username only, followed by the facilitator replying with additional information that is to be submitted by the AMC client.

In an authentication process between an AMC client and a facilitator, for example, the AMC client indicates the user on whose behalf the connection is being made. The user is then authenticated. The AMC client may send additional attributes per the authentication mechanism in use.

Facilitator-to-facilitator authentication is different from AMC client-to-facilitator authentication because the domain is authenticated instead of a single user being authenticated. Consequently, the two facilitators each supply their respective facilitator certificates that ascertain-their domains.

Following establishment of a connection, the endpoints may transfer data (both commands and data) via the connection during the data transfer state. The data are transferred asynchronously but are not so limited. Messages are transferred from one endpoint to the other.

Every message sent from a sender to a recipient has a corresponding acknowledgement message (ACK) sent from the recipient to the sender. If the acknowledgement message (ACK) is not received within a pre-specified period of time (the protocol does not specify the duration as it is configurable based on network characteristics), the sender assumes the message was never received by the recipient and resends the message. The acknowledgement message (ACK) may also specify an error condition pertaining to the message. Each acknowledgement message (ACK) has the following format, as an example, but is not so limited:

```
<ACK>
    <message>MSG</message>
    <op_id>OP_ID</op_id>
    <ref_id>ID</ref_id>
    <result_code>RESULT_CODE</result_code>
    <result_str>RESULT_STR</result_str>           [Optional]
    <time>12323453456312</result_code>
</ACK>
```

Parameters of the acknowledgement message (ACK) include the following: MSG represents a message that is being acknowledged; OP_ID represents operation ID of message being acknowledged; ID represents entity ID corresponding to the message (this ID may be new and generated by the facilitator if the message is successful); RESULT_CODE represents result code for the message; and RESULT_STR represents result string corresponding to the result code.

After a successful connection, the AMC client sends all of its state updates (including adds, updates, and deletes) to the facilitator after a successful login. The facilitator, on the other hand, can then send all of its state updates. However, the embodiment is not so limited.

The facilitator can send the AMC client zero or more combinations of the following messages:
  USER—0 or 1 such message should come;
  AVAIL_PROFILE—n such messages should come where n is the number of profiles added, removed or modified since the SYNC time;
  AVAILABILITY—1 such message should come;
  CONTACT—n such messages should come where n is the number of CONTACTS added, removed or modified since the SYNC time;
  AC_REQ—n such messages should come where n is the number of Active Call requests sent and received by the AMC client since SYNC time;
  AC_RESP—n such messages should come where n is the number of Active Call responses sent and received by the AMC client since SYNC time; and
  $DEL_{13}$ CONF—n such messages should come where n is the number of Delivery Confirmations sent and received by the AMC client since SYNC time.

A connection may be refused because the facilitator is not able to support the sender. In this case, a redirection message may be sent. Following transmission of a redirection message from the receiver, the receiver may choose to ignore all subsequent messages sent from a sender. However, because acknowledgements were never received by the sender, the sender reconnects to the appropriate facilitator and resends all messages.

The connection tear down state is entered when either endpoint of the connection closes the connection. However, in an embodiment either endpoint tears down a connection by first sending a tear-down message to the other endpoint of the connection and waiting for the other endpoint to acknowledge the message before closing the connection. Either endpoint may send the tear-down message. The endpoint receiving a tear-down message acknowledges the message upon completing transfers of all data designated for transfer.

Figure 33:
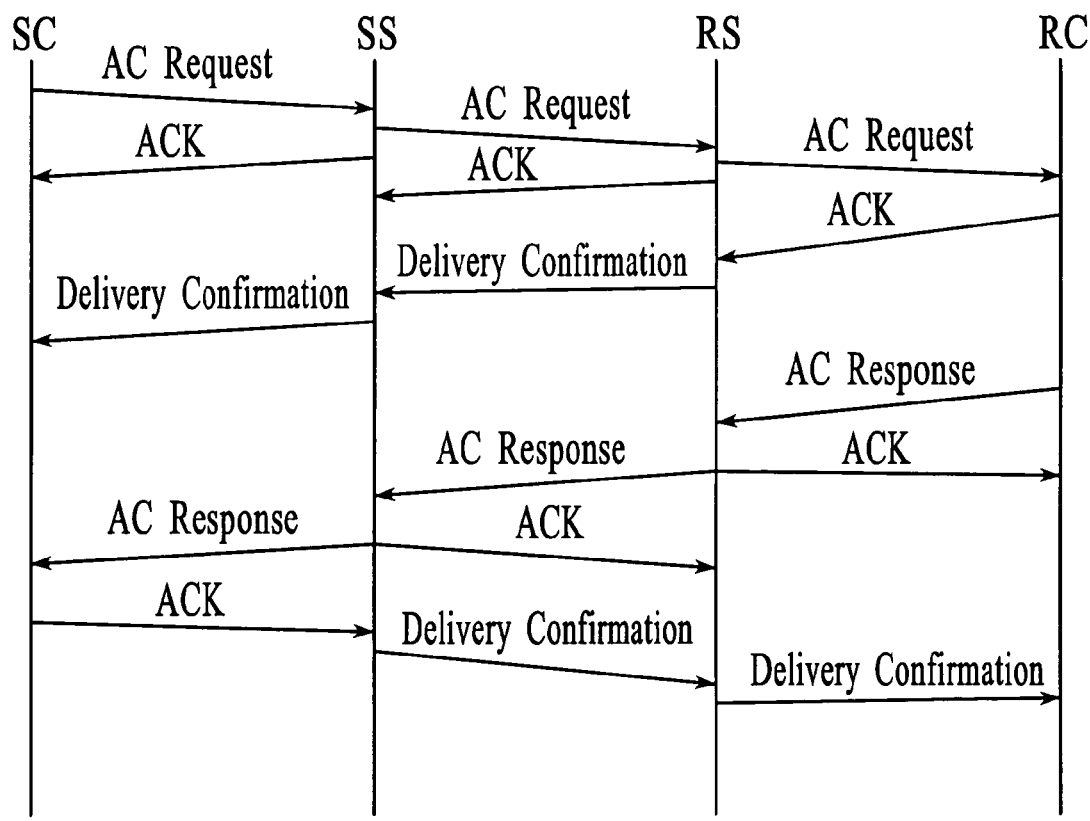
FIG. 33 is a message flow diagram for an active call flow, under an embodiment.

Considering the AMC system protocol, the Active Call flow described above with reference to FIG. 11 is revisited. FIG. 33 is a message flow diagram for an active call flow, under an embodiment. The active call flow includes three types of messages: Active Call Request (ACRequest); Active Call Response (ACResponse); and Delivery Confirmation (DeliveryConfirmation). An active call is initiated with an ACRequest; logically, it is sent by the Sender Client (SC) to the Recipient Client (RC); the SC and RC are both AMC clients hosted on separate handsets. When the RC receives the ACRequest, it sends a Delivery Confirmation back to the SC. The RC also may send an ACResponse, indicating acceptance or postponement of the corresponding ACRequest. When the SC receives the ACResponse, it also sends back a Delivery-Confirmation to the RC.

The SC and the RC of an embodiment do not communicate directly with each other but rather convey information via one or more facilitators hosted on one or more servers, where the servers are referred to as the Sender Server (SS) and the Recipient Server (RS). The SC connects to the SS while the RC connects to the RS. The SS and RS may be in the same domain or different domains.

To optimize client traffic and reduce bandwidth, Delivery Confirmations are not generated by the AMC clients themselves. Instead, the RS sends a Delivery Confirmation message when it receives the ACK from the AMC client.

Delivery Confirmations are automatically generated by the system, enabling the sender to know of the status of the message. Unlike a Delivery Confirmation, an Active Call Response message is only generated after user input, indicating a response to the active call request. The three components of active calls, Active Call Requests, Active Call Response, and Delivery Confirmations are each described in turn below.

Beginning with the Active Call Request, the SC generates a new Active Call Request message (ACRequest) for transmission to the SS. In response to the Active Call Request message, SS sends an acknowledgement message (ACK) to SC. The SS then sends an Active Call Request message (ACRequest) to RS, and RS responds by sending an acknowledgement message (ACK) to SS. The RS also sends an Active Call Request message (ACRequest) to RC. If RC is able to process the request message (ACRequest) from RS, then RC sends an acknowledgement message (ACK) to RS. During this Active Call Request call flow, if any Active Call Request message (ACRequest) remains undelivered and expiry is reached, then SC, SS (optional) and RS (optional) mark the status of the request as "failed to deliver" and each processing endpoint in the chain ceases to forward the request any further.

Continuing with the active call flow following the Active Call Request, the SC Active Call Response is a message generated on the handset by the recipient of the Active Call Request in response to the Active Call Request described above. The sender of an Active Call Request is the recipient of the Active Call Response, and the recipient of the Active Call Request is the sender of Active Call Response.

In response to receipt of the Active Call Request, and with continuing reference to FIG. 33, RC generates an Active Call response message (ACResponse). In response to receipt of the Active Call Request message (ACRequest), RS sends an acknowledgement message (ACK) to RC. In response to receipt of the acknowledgement message (ACK) RS sends an Active Call Response message (ACResponse) to SS. During the Active Call Response described herein if RC chooses to ignore the response message (ACResponse) and does not respond with a response message, then SC, SS, RS, and RC expire the response and set the status as "expired".

In response to receipt of the Active Call Response message (ACResponse) SS sends an acknowledgement message (ACK) to RS. In response to receipt of the acknowledgement message SS sends an Active Call Response message (ACResponse) to SC. During the Active Call Response described herein if RC chooses to ignore the Active Call Response message (ACResponse) and does not respond, then SC, SS, RS, and RC expire the response and set the status as "expired".

In response to receipt of the Active Call Response message (ACResponse) SC sends an acknowledgement message (ACK) to SS. During the Active Call Response if RC chooses to ignore the Active Call Response message (ACResponse) and does not respond, then SC, SS, RS, and RC expire the response and set the status as "expired". Furthermore, if the status of the Active Call Response message (ACResponse) remains "undelivered" and expiry of the Active Call Request message (ACRequest) is reached, then RC, RS, SS and SC mark the Active Call Request message (ACRequest) status as "expired"; if the Active Call Response message (ACResponse) status is "undelivered" and the status of the Active Call Request message (ACRequest) changes to "expired", an endpoint marks the Active Call Response message (ACResponse) as "expired".

Continuing with the active call flow following the Active Call Response, delivery confirmations are sent after both Active Call Requests and Active Call Responses. The sender of an active call request is the recipient of the active call response, and the recipient of the active call request is the sender of active call response.

In response to an Active Call Request, and with continuing reference to FIG. 33, RC sends a Delivery Confirmation message to SC, where RC is connected to RS (Recipient Server) and SC is connected to SS (Sender Server). A similar Delivery Confirmation message in response to the Active Call Response message is also possible. In response to receipt of the Delivery Confirmation message RS sends an acknowledgement message (ACK) to RC. In response to receipt of the acknowledgement message (ACK) RS sends a Delivery Confirmation message to SS. In response to receipt of the Delivery Confirmation message SS sends an acknowledgement message (ACK) to RS. In response to receipt of the acknowledgement message (ACK) SS sends a Delivery Confirmation message to SC. In response to receipt of the delivery confirmation message SC sends an acknowledgement message (ACK) to SS.

The active mobile collaboration system and methods described herein include a method for communicating, comprising: selecting at least one recipient to receive a voice call from a caller using a calling device and generating a call request at the calling device; transferring the call request from the calling device to at least one target device of the recipient via a data coupling; providing a delivery confirmation to the caller at the calling device in response to delivery of the transferred call request to the target device; generating a plurality of response options on the target device in response to receipt of the call request, wherein the response options include at least one of accepting the call request, postponing the call request, generating a return data message including at least one of a text message and a voice message to the calling device, and initiating the voice call; and generating a response message in response to selection of a response option by the recipient on the target device and transferring the response message to the calling device over the data coupling.

The method of an embodiment further comprises delivering the call request to the target device in accordance with context information, the context information including at least one of a connectivity state and an availability profile of the target device.

The method of an embodiment further comprises delivering the call request to one or more additional target devices of one or more additional recipients, wherein the target device and the additional target devices form a recipient group of target devices.

The connectivity state of an embodiment includes information of a state of connectivity of the target device to a communication network.

The availability profile of an embodiment includes information of at least one of control parameters of the target device and call screening filters, wherein the availability profile is selected by the recipient. The call screening filters of an embodiment include one or more filters that filter the call request using at least one of identity of a caller originating the call request, priority of the call request, subject of the request, and requested time of the voice call. The call screening filters of an embodiment include at least one of priority filters, allow filters, and block filters, wherein the priority filters define a minimum level of message priority for which the recipient is willing to receive notification, wherein the allow filters define at least one list of callers from whom the recipient will receive messages and calls, wherein the block filters define at least one list of callers from whom the recipient will not receive messages and calls. The control parameters of the target device of an embodiment include at least one of speaker volume, ringer volume, audible alert type, audible alert volume, at least one vibrate alert parameter, and at least one visual alert parameter.

The connectivity state of an embodiment includes at least one of a reachable state and an unreachable state, wherein the target device is in a reachable state when the target device is in a powered state and connected to a corresponding communication network, wherein the target device is in an unreachable state when the target device is at least one of in an un-powered state, disconnected from the communication network, and engaged in a voice call.

The method of an embodiment further comprises establishing a mapping between the caller and the calling device and establishing a mapping between the recipient and the target device.

In an embodiment, the calling device at which the caller selects the recipient is a first device of the caller to which the caller is electronically mapped at a time of the selection.

In an embodiment, the calling device at which the caller receives the response message is an Nth device of the caller to which the caller is electronically mapped at a delivery time of the response message.

The target device at which the recipient receives the call request of an embodiment is a first device of the recipient to which the recipient is electronically mapped.

The target device at which the recipient selects the response option of an embodiment is an Nth device of the recipient to which the recipient is electronically mapped.

The method of an embodiment further comprises transferring context information of the target device to the calling device over the data coupling. The method of an embodiment further comprises displaying the context information in at least one list of contact information of the target device, wherein the context information is displayed to correspond to the recipient mapped to the target device. The context information of an embodiment includes at least one of presence information of the target device and a current availability state of the target device, wherein the current availability state is at least one of manually selected by the recipient and automatically selected in response to at least one of profile information, call filter information, location of the target device, and calendar information. The method of an embodiment further comprises automatically transferring updates of the context information of the target device to the calling device over the data coupling. The method of an embodiment further comprises automatically transferring a request for updates of the context information from the calling device over the data coupling.

The method of an embodiment further comprises monitoring a state of the call request and transferring state messages including the call request state to the calling device via the data coupling. The state of the call request of an embodiment includes at least one of not sent, in transit, delivered, failed to deliver, request expired, being retracted, and failed to retract states. The call request of an embodiment includes at least one of a request priority, a text subject, a voice subject, a phone number of a caller originating the request, and an expiration time.

The method of an embodiment further comprises automatically scheduling the call for a future time on at least one of the calling device and the target device in response to the selected response options of accepting the call request and postponing the call request. The method of an embodiment further comprises automatically generating a reminder at the future time and providing the reminder on the target device, wherein the reminder includes at least one of reminder messages, visual alerts, vibrate alerts, and audible alerts, wherein the reminder includes a prompt for use in initiating communication with the calling device. The method of an embodiment further comprises automatically generating a reminder at the future time and providing the reminder on the calling device, wherein the reminder includes at least one of reminder messages, visual alerts, vibrate alerts, and audible alerts, wherein the reminder includes a prompt for use in initiating communication with the target device.

The method of an embodiment further comprises queuing the call request. The queuing of an embodiment comprises automatically scheduling the call when context information of the caller and the recipient indicates the caller and the recipient are available. The queuing of an embodiment comprises automatically initiating the call when context information of the caller and the recipient indicates the caller and the recipient are available.

The method of an embodiment further comprises automatically transferring a notification message to the calling device upon a change in a current availability state of the target device.

The method of an embodiment further comprises receiving at the calling device the response message accepting the call request, wherein the response message includes a prompt for use in initiating the call.

The method of an embodiment further comprises: receiving at the calling device the response message postponing the call request; and queuing a reminder in accordance with a postponement period of the response message. The method of an embodiment further comprises providing an alert message to the caller on the calling device in response to expiration of the postponement period and an available state of the target device, wherein the alert message includes at least one prompt for use in one of initiating the call and re-sending the call request to the target device. The method of an embodiment further comprises providing an alert message to the caller on the calling device in response to expiration of the postponement period and an unavailable state of the target device, wherein the alert message includes at least one prompt for use in one of initiating the call, re-sending the call request to the target device, and requesting monitoring of the unavailable state of the target device and notification when the unavailable state changes to an available state.

The call request of an embodiment is a data message. The data message of an embodiment includes at least one of a text message and a voice message.

Transferring the call request in an embodiment further comprises automatically transferring contents of the call request to the target device in at least one of an electronic message of at least one form. The electronic message of an embodiment includes at least one of an electronic mail message, an instant message, a Short Message Service (SMS) message, a Multimedia Messaging Service (MMS) message, and an Enhanced Messaging Service (EMS) message.

The method of an embodiment further comprises monitoring a context of the target device and automatically broadcasting information of the context to the calling device. The context information of an embodiment includes at least one of information of a state of connectivity of the target device to a communication network and availability of the recipient, wherein the availability of the recipient is determined using at least one of identity information of the caller, priority of the call request, subject of the request, and requested time of the call. The method of an embodiment further comprises automatically broadcasting information of the context to a plurality of other client devices. The other client devices of an embodiment include information of the target device in a memory area.

The method of an embodiment further comprises monitoring a context of the calling device and automatically broadcasting information of the context to at least one of the target device and a plurality of other client devices. The context information of an embodiment includes at least one of information of a state of connectivity of the calling device to a communication network and availability of the caller.

The method of an embodiment further comprises broadcasting context information of the target device to a first group of devices including the calling device via the data coupling. The method of an embodiment further comprises automatically maintaining and displaying information of a current availability state of the recipient in at least one phonebook of devices of the first group using the broadcasted context information. The availability state of the recipient of an embodiment is at least one of manually selected by the recipient and automatically selected in response to at least one of profile information, call filter information, location of the target device, and calendar information.

The method of an embodiment further comprises broadcasting context information of the calling device to a second group of devices including the target device via the data coupling. The method of an embodiment further comprises automatically maintaining and displaying information of a current availability state of the caller in at least one phonebook of devices of the second group using the broadcasted context information. The availability state of the caller of an embodiment is at least one of manually selected by the caller and automatically selected in response to at least one of profile information, call filter information, location of the target device, and calendar information.

The calling device of an embodiment includes a communication device on which the caller is currently logged in for use, wherein the mapping is in response to caller login and comprises updating on the calling device at least one of contact list information, information of one or more caller communication events, and currently-selected caller availability profiles including information of at least one of control parameters of the calling device and call screening filters.

The target device of an embodiment includes a communication device on which the recipient is currently logged in for use, wherein the mapping is in response to recipient login and comprises updating on the target device at least one of contact list information, information of one or more recipient communication events, and currently-selected recipient availability profiles including information of at least one of control parameters of the target device and call screening filters.

The method of an embodiment further comprises receiving contact information at the calling device, wherein the contact information includes identification information of each of a plurality of devices including the target device, wherein the call request is transferred using the contact information.

The method of an embodiment further comprises: generating a plurality of contact lists using information from one or more sources of contact information, wherein the contact information includes identification information of each of a plurality of devices including the target device; and accessing the plurality of contact lists using the calling device, wherein selecting the recipient includes selecting the recipient from one of the contact lists.

The selection of at least one recipient of an embodiment further includes selecting one or more recipients using availability information of the recipients and contact information of the recipients. The availability information of an embodiment is in one or more availability databases and the contact information is in one or more contact databases.

The calling device of an embodiment is at least one of a mobile device, a wireless device, a wireline device, a voice over Internet Protocol (VOIP) device, a private branch exchange device, a soft client, and a desktop client. The target device of an embodiment is at least one of a mobile device, a wireless device, a wireline device, a voice over Internet Protocol (VOIP) device, a private branch exchange device, a soft client, and a desktop client.

The active mobile collaboration system and methods described herein include a method for communicating, comprising: selecting at least one recipient to receive a voice call from a calling device, wherein the recipient is mapped to a target device; generating and transferring a call request in the form of a data message to the target device via a data coupling and continuously monitoring a state of the call request, wherein an originator of the call request is mapped to the calling device; generating a plurality of response options on the target device in response to receipt of the call request, wherein the response options include at least one of postponing the call request and generating a return data message including at least one of a text message and a voice message to the calling device; automatically scheduling the call for a future time on at least one of the calling device and the target device in response to the selected response option; and automatically providing a reminder that includes at least one of a reminder message and at least one type of alert on at least one of the calling device and the target device at the future time, wherein the reminder includes a prompt for use in initiating communication between the calling and target devices.

The active mobile collaboration system and methods described herein include a method for communicating, comprising: automatically monitoring a context of a target device and broadcasting the context to a group of devices including an originating device over a data coupling, the context including at least one of information of a state of connectivity of the target device to a communication network and availability of a recipient mapped to the target device; selecting the recipient to receive a voice call from the originating device; generating a call request appropriate to the context of the target device; transferring the call request to the target device via the data coupling; generating a plurality of response options on the target device in response to receipt of the call request, wherein the response options include at least one of accepting the call request, postponing the call request, generating a return data message including at least one of a text message and a voice message to the calling device, and initiating the voice call; and providing a response message to a user mapped to the calling device via the data coupling in response to a selected response option on the target device;

The active mobile collaboration system and methods described herein include a method for communicating, comprising: automatically determining and broadcasting a context of a first device to at least one group of devices that include a second device, the context including availability information of a first user mapped to the first device; selecting the first user to participate in a communication event; generating a request for the communication event appropriate to the context of the target device and transferring the request to the first device via the data coupling; providing a plurality of response options on the first device in response to receipt of the request and transferring a response message to the second device appropriate to a selected response option, wherein a second user is mapped to the second device; automatically scheduling the communication event at a future time on at least one of the first and second devices in response to the selected response option; and automatically providing a reminder to at least one of the first and second users at the future time.

The active mobile collaboration system and methods described herein include a communication system comprising communication devices that include a first component of a communication management system (CMS) configured to: map information of a first user to a first device of the communication devices; generate and transfer a request from the first device to a second device via a data coupling, wherein the request is a request for a voice call via a voice coupling with the second device; maintain and provide state information of the request to the first device; provide a plurality of response options on the second device in response to delivery of the request, wherein the response options include at least one of accepting the request, postponing the request, generating a return data message including at least one of a text message and a voice message to the originating device, and initiating the voice call; and automatically provide a response message to the first user via the data coupling in response to selection of a response option on the second device.

The active mobile collaboration system and methods described herein include a communication device including at least one processor coupled to at least one user interface, the device configured to: generate a call request to at least one recipient in response to selection of the recipient by an originator, wherein the call request includes information of a requested communication event with the recipient at a future time, wherein the call request automatically provides the recipient with a plurality of response options on the target device, the response options including at least one of accepting the call request, postponing the call request, generating a return data message including at least one of a text message and a voice message to the calling device, and initiating the voice call; transfer the call request to at least one target device to which the recipient is mapped via a data coupling; automatically receive state messages of a state of the call request transfer via the data coupling; and receive a response message via the data coupling in response to selection of a response option by the recipient on the target device.

The active mobile collaboration system and methods described herein include a communication system, comprising: means for selecting on an originating device at least one recipient to participate in a communication event with an originator who is mapped to the originating device; means for generating a request to participate in the communication event in response to selection of the recipient; means for transferring the request from the originating device to at least one target device via a data coupling, wherein the recipient is mapped to the target device; means for automatically monitoring a state of the request and providing messages of the state on the originating device via the data coupling; means for generating a plurality of response options on the target device in response to receipt of the request, wherein the response options include at least one of accepting the request, postponing the request, generating a return data message to the originating device, and initiating the communication event; and means for automatically generating a response message in response to selection of a response option by the recipient on the target device and transferring the response message to the originating device over the data coupling.

The system of an embodiment further comprises means for delivering the request to the target device in accordance with context information, the context information including at least one of a connectivity state and an availability profile of the target device.

The system of an embodiment further comprises means for transferring context information of the target device to the originating device over the data coupling. The system of an embodiment further comprises means for displaying the context information in at least one list of contact information of the originating device, wherein the context information is displayed to correspond to the recipient mapped to the target device.

The system of an embodiment further comprises means for automatically scheduling the communication event for a future time on at least one of the originating device and the target device in response to the selected response options of accepting the request and postponing the request. The system of an embodiment further comprises means for automatically generating a reminder at the future time and providing the reminder on the target device, wherein the reminder includes at least one of reminder messages and audible alerts, wherein the reminder includes a prompt for use in initiating the communication event with the originating device. The system of an embodiment further comprises means for automatically generating a reminder at the future time and providing the reminder on the originating device, wherein the reminder includes at least one of reminder messages and audible alerts, wherein the reminder includes a prompt for use in initiating the communication event with the target device.

The system of an embodiment further comprises means for queuing the request.

The system of an embodiment further comprises means for automatically transferring a notification message to the originating device upon a change in a current availability state of the target device.

The system of an embodiment further comprises means for receiving at the originating device the response message accepting the request, wherein the response message includes a prompt for use in initiating the communication event.

The system of an embodiment further comprises: means for receiving at the originating device the response message postponing the request; and means for queuing a reminder in accordance with a postponement period of the response message.

The request of an embodiment is a data message that includes at least one of a text message and a voice message.

The system of an embodiment further comprises means for monitoring a context of the originating device and automatically broadcasting information of the context to at least one of the target device and a plurality of other devices, wherein the context information includes at least one of information of a state of connectivity of the originating device to a communication network and availability of the originator.

The system of an embodiment further comprises means for providing contact information at the originating device, wherein the contact information includes identification information of each of a plurality of devices including the target device, wherein the request is transferred using the contact information.

The system of an embodiment further comprises: means for generating a plurality of contact lists using information from one or more sources of contact information, wherein the contact information includes identification information of each of a plurality of devices including the target device; and means for accessing the plurality of contact lists using the originating device, wherein selecting the recipient includes selecting the recipient from one of the contact lists.

The active mobile collaboration system and methods described herein include a machine readable medium including instructions which, when executed in a processing system, provide communications by: selecting at least one recipient to receive a voice call from a calling device and generating a call request at the calling device, wherein an originator of the call request is mapped to the calling device; transferring the call request from the calling device to at least one target device via a data coupling, wherein the recipient is mapped to the target device; monitoring a state of the call request and transferring state messages including the call request state to the calling device via the data coupling; generating a plurality of response options on the target device in response to receipt of the call request, wherein the response options include at least one of accepting the call request, postponing the call request, generating a return data message including at least one of a text message and a voice message to the calling device, and initiating the voice call; and generating a response message in response to selection of a response option by the recipient on the target device and transferring the response message to the calling device over the data coupling.

The active mobile collaboration system and methods described herein include a method for communicating, comprising: selecting at least one recipient to receive a voice call from a calling device and generating a call request at the calling device, wherein an originator of the call request is mapped to the calling device; transferring the call request from the calling device to at least one target device via a data coupling, wherein the recipient is mapped to the target device; continuously monitoring a state of the call request and transferring state messages including the call request state to the calling device via the data coupling; generating a plurality of response options on the target device in response to receipt of the call request, wherein the response options include at least one of accepting the call request, postponing the call request, generating a return data message including at least one of a text message and a voice message to the calling device, and initiating the voice call; and generating a response message in response to selection of a response option by the recipient on the target device and transferring the response message to the calling device over the data coupling.

Aspects of the active mobile collaboration system described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the active mobile collaboration system include: microcontrollers with memory (such as electronically erasable programmable read only memory (EEPROM)), embedded microprocessors, firmware, software when executed on an operatively associated communication system, etc. Furthermore, aspects of the active mobile collaboration system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the active mobile collaboration system is not intended to be exhaustive or to limit the system to the precise forms disclosed. While specific embodiments of, and examples for, the active mobile collaboration system are described herein for illustrative purposes, various equivalent modifications are possible within the scope of the system, as those skilled in the relevant art will recognize. The teachings of the active mobile collaboration system provided herein can be applied to other processing systems and communication systems, not only for the systems described above.

The elements and acts of the various embodiments described above can be combined to provide further embodiments. These and other changes can be made to the active mobile collaboration system in light of the above detailed description.

All of the above references and United States patents and patent applications are incorporated herein by reference. Aspects of the active mobile collaboration system can be modified, if necessary, to employ the systems, functions and concepts of the various patents and applications described above to provide yet further embodiments of the system.

In general, in the following claims, the terms used should not be construed to limit the active mobile collaboration system to the specific embodiments disclosed in the specification and the claims, but should be construed to include all processing systems that operate under the claims to provide communications. Accordingly, the active mobile collaboration system is not limited by the disclosure, but instead the scope of the system is to be determined entirely by the claims.

While certain aspects of the active mobile collaboration system are presented below in certain claim forms, the inventors contemplate the various aspects of the system in any number of claim forms. For example, while only one aspect of the system is recited as embodied in computer-readable medium, other aspects may likewise be embodied in computer-readable medium. Accordingly, the inventors reserve the right to add additional claims after filing the application to pursue such additional claim forms for other aspects of the active mobile collaboration system.

What is claimed is:

1. A method for communicating, comprising:

transferring context information for a plurality of target devices to a calling device, wherein the context information comprises data representative of at least one of the group consisting of an availability profile and a connectivity state for each of the plurality of target devices;

after receiving the context information, selecting, from the plurality of target devices, at least one recipient associated with a selected at least one target device to receive a voice call from a caller using the calling device;

generating a call request at the calling device responsive to selecting the at least one recipient;

wherein the connectivity state includes a reachable state and an unreachable state, wherein the selected at least one target device is in a reachable state when the selected at least one target device is in a powered state and connected to the communication network, and wherein the at selected least one target device is in an unreachable state when the selected at least one target device is in an un-powered state, disconnected from the communication network or engaged in a voice call;

wherein the availability profile includes one of a group consisting of information manually selected by the recipient, information automatically selected in response to profile information of the at least one target device, call filter information, location of the at least one target device and calendar information;

queuing the call request so as to defer transfer of the call request to the selected at least one target device in accordance with context information of both the selected at least one target device and the calling device;

in accordance with the context information of both the selected at least one target device and the calling device indicating a reachable state, automatically delivering the call request from the calling device to the selected at least one target device of the selected at least one recipient via a data coupling;

providing a delivery confirmation to the caller at the calling device in response to delivery of the transferred call request to the selected at least one target device;

generating a plurality of response options on the selected at least one target device in response to receipt of the call request, wherein the response options include at least one of accepting the call request, postponing the call request, generating a return data message including a text message to the calling device or a voice message to the calling device, and initiating the voice call; and generating a response message in response to selection of a response option by the recipient on the selected at least one target device and transferring the response message to the calling device over the data coupling.

2. The method of claim 1, further comprising delivering the call request to at least one selected additional target devices associated with at least one selected additional recipients, wherein the at least one selected target device and the at least one selected additional target devices form a recipient group of target devices.

3. The method of claim 1, wherein the availability profile includes information of at least one of control parameters of the selected at least one target device and call screening filters selected by the recipient.

4. The method of claim 3, wherein the call screening filters include at least one filter that filter the call request using at least one of identity of a caller originating the call request, priority of the call request, subject of the request, and requested time of the voice call.

5. The method of claim 3, wherein the call screening filters include at least one of priority filters, allow filters, and block filters, wherein the priority filters define a minimum level of message priority for which the at least one recipient is willing to receive notification, wherein the allow filters define at least one list of callers from whom the at least one recipient will receive messages and calls, wherein the block filters define at least one list of callers from whom the at least one recipient will not receive messages and calls.

6. The method of claim 3, wherein the control parameters of the at least one target device include at least one of speaker volume, ringer volume, audible alert type, audible alert volume, at least one vibrate alert parameter, and at least one visual alert parameter.

7. The method of claim 1, further comprising establishing a mapping between the caller and the calling device and establishing a mapping between the at least one recipient and the at least one target device.

8. The method of claim 1, wherein the calling device at which the caller selects the at least one recipient is a first device of the caller to which the caller is electronically mapped at a time of the selection.

9. The method of claim 1, wherein the calling device at which the caller receives the response message is an Nth device of the caller to which the caller is electronically mapped at a delivery time of the response message.

10. The method of claim 1, wherein the at least one target device at which the at least one recipient receives the call request is a first device of the at least one recipient to which the at least one recipient is electronically mapped.

11. The method of claim 1, wherein the selected at least one target device at which the at least one recipient selects the response option is an Nth device of the at least one recipient to which the at least one recipient is electronically mapped.

12. The method of claim 1, further comprising displaying the context information in at least one list of contact information of the target device, wherein the context information is displayed to correspond to the at least one recipient mapped to the selected at least one target device.

13. The method of claim 1, further comprising automatically transferring updates of the context information of the plurality of target devices to the calling device over the data coupling before delivering a call request from the calling device to the at least one target device.

14. The method of claim 1, further comprising automatically transferring a request for updates of the context information from the calling device over the data coupling.

15. The method of claim 1, further comprising monitoring a state of the call request and transferring state messages including the call request state to the calling device via the data coupling.

16. The method of claim 15, wherein the state of the call request includes at least one of not sent, in transit, delivered, failed to deliver, request expired, being retracted, and failed to retract states.

17. The method of claim 15, wherein the call request includes at least one of a request priority, a text subject, a voice subject, a phone number of a caller originating the request, and an expiration time.

18. The method of claim 1, further comprising automatically scheduling the voice call for a future time with the selected at least one target device.

19. The method of claim 18, further comprising automatically generating a reminder at the future time and providing the reminder on the at least one target device, wherein the reminder includes at least one of reminder messages, visual alerts, vibrate alerts, and audible alerts, wherein the reminder includes a prompt for use in initiating communication with the calling device.

20. The method of claim 18, further comprising automatically generating a reminder at the future time and providing the reminder on the calling device, wherein the reminder includes at least one of reminder messages, visual alerts, vibrate alerts, and audible alerts, wherein the reminder includes a prompt for use in initiating communication with the target device.

21. The method of claim 1, wherein queuing comprises automatically scheduling the voice call when context information of the caller and the at least one recipient indicates the caller and the at least one recipient are available.

22. The method of claim 1, wherein queuing comprises automatically initiating the voice call when context information of the caller and the at least one recipient indicates the caller and the at least one recipient are available.

23. The method of claim 1, further comprising automatically transferring a notification message to the calling device upon a change in a current availability state of at least one of the plurality of target devices before delivering the call request from the calling device to the at least one target device.

24. The method of claim 1, further comprising receiving at the calling device the response message accepting the call request, wherein the response message includes a prompt for use in initiating the voice call.

25. The method of claim 1, further comprising: receiving at the calling device the response message postponing the call request; queuing a reminder in accordance with a postponement period of the response message.

26. The method of claim 25, further comprising providing an alert message to the caller on the calling device in response to expiration of the postponement period and an available state of the at least one target device, wherein the alert message includes at least one prompt for use in one of initiating the call and re-sending the call request to the at least one target device.

27. The method of claim 25, further comprising providing an alert message to the caller on the calling device in response to expiration of the postponement period and an unavailable state of the at least one target device, wherein the alert message includes at least one prompt for use in one of initiating the call, re-sending the call request to the at least one target device, and requesting monitoring of the unavailable state of the at least one target device and notification when the unavailable state changes to an available state.

28. The method of claim 1, wherein the call request is a data message.

29. The method of claim 28, wherein the data message includes at least one of a text message and a voice message.

30. The method of claim 1, wherein transferring the call request further comprises automatically transferring contents of the call request to the selected at least one target device in at least one of an electronic message of at least one form.

31. The method of claim 30, wherein the electronic message includes at least one of an electronic mail message, an instant message, a Short Message Service (SMS) message, a Multimedia Messaging Service (MMS) message, and an Enhanced Messaging Service (EMS) message.

32. The method of claim 1, further comprising monitoring a context of the selected at least one target device and automatically broadcasting information of the context to the calling device.

33. The method of claim 32, wherein the availability profile includes data representative of an availability of the at least one recipient is determined using at least one of identity information of the caller, priority of the call request, subject of the request, and requested time of the voice call.

34. The method of claim 32, further comprising automatically broadcasting information of the context to a plurality of other client devices.

35. The method of claim 1, further comprising monitoring a context of the calling device and automatically broadcasting information of the context to the selected at least one target device and a plurality of other client devices.

36. The method of claim 35, wherein the context information includes at least one of information of a state of connectivity of the calling device to a communication network and availability of the caller.

37. The method of claim 1, further comprising broadcasting the context information of the selected at least one target device to a first group of devices including the calling device via the data coupling.

38. The method of claim 37, further comprising automatically maintaining and displaying information of a current availability state of the selected at least one recipient in at least one phonebook of devices of the first group using the broadcasted context information.

39. The method of claim 1, further comprising broadcasting the context information of the calling device to a second group of devices including the selected at least one target device via the data coupling.

40. The method of claim 39, further comprising automatically maintaining and displaying information of a current availability state of the caller in at least one phonebook of devices of the second group using the broadcasted context information.

41. The method of claim 40, wherein the availability state of the caller is at least one of manually selected by the caller and automatically selected in response to at least one of profile information, call filter information, location of the selected at least one target device, and calendar information.

42. The method of claim 1, wherein the calling device includes a communication device on which the caller is currently logged in for use, wherein the mapping is in response to caller login and comprises updating on the calling device at least one of contact list information, information of one or more caller communication events, and currently-selected caller availability profiles including information of at least one of control parameters of the calling device and call screening filters.

43. The method of claim 1, wherein the selected at least one target device includes a communication device on which the selected at least one recipient is currently logged in for use, wherein the mapping is in response to the selected at least one recipient login and comprises updating on the at least one target device with at least one of contact list information, information of one or more recipient communication events, and currently-selected recipient availability profiles including information of at least one of control parameters of the at least one target device and call screening filters.

44. The method of claim 1, further comprising receiving contact information at the calling device, wherein the contact information includes identification information of each of a plurality of target devices including the selected at least one target device, wherein the call request is transferred using the contact information.

45. The method of claim 1, further comprising: generating a plurality of contact lists using information from one or more sources of contact information, wherein the contact information includes identification information of each of the plurality of target devices including the at selected least one target device; and accessing the plurality of contact lists using the calling device, wherein selecting the selected at least one recipient includes selecting the at least one recipient from one of the contact lists.

46. The method of claim 1, wherein selecting the selected at least one recipient further includes selecting one or more recipients using availability information of the recipients and contact information of the recipients.

47. The method of claim 46, wherein the availability information is in one or more availability databases and the contact information is in one or more contact databases.

48. The method of claim 1, wherein the calling device is at least one of a mobile device, a voice over Internet Protocol (VOIP) device, a private branch exchange device, a soft client, and a desktop client.

49. The method of claim 1, wherein the at least one target device is at least one of a mobile device, a voice over Internet Protocol (VOIP) device, a private branch exchange device, a soft client, and a desktop client.

50. An apparatus, comprising:
   means for receiving context information for a plurality of target devices at a calling device, wherein the context information comprises data representative an availability profile for each of the plurality of target devices;
   means for outputting the context information;
   means for selecting at least one recipient associated with a selected at least one target device to receive a voice call coupled to the means for outputting;

means for generating a call request to the selected at least one target device responsive to the means for selecting;

wherein the availability profile for each of the plurality of target devices comprises data representative of willingness and ability of a recipient associated with the target device to receive a communication;

means for queuing the call request in accordance with the recipient having an inability to receive a communication;

means for automatically delivering the call request to the selected at least one target device in accordance with the context information of the selected at least one target device indicating an ability to receive a communication and context information of the calling device indicating an ability to send a communication;

means for receiving a delivery confirmation that the call request was delivered to the selected at least one target device; and means for receiving a response message for the call request from the selected at least one target device.

51. The apparatus of claim 50, wherein the availability profile includes information of at least one of control parameters of the selected at least one target device and call screening filters selected by the recipient.

52. The apparatus of claim 50, further comprising means for automatically receiving updates of the context information of the plurality of target devices;

wherein the means for outputting is responsive to the means for automatically receiving updates to output the updated context information.

53. The apparatus of claim 50, further comprising means for receiving a state of the call request;

wherein the state of the call request includes at least one of not sent, in transit, delivered, failed to deliver, request expired, being retracted, and failed to retract states.

54. The apparatus of claim 50, wherein the call request includes at least one of a request priority, a text subject, a voice subject, a phone number of a caller originating the request, and an expiration time.

55. The apparatus of claim 50, further comprising means for automatically scheduling a voice call for a future time with the selected at least one target device in response to the selected response options of accepting the call request and postponing the call request.

56. The apparatus of claim 55, further comprising means for automatically generating a reminder at the future time;

wherein the reminder includes at least one of reminder messages, visual alerts, vibrate alerts, and audible alerts, wherein the reminder includes a prompt for use in initiating communication with the selected at least one target device.

57. The method of claim 1, wherein the availability profile for each of the plurality of target devices comprises data representative of willingness and ability of a recipient associated with the target device to receive a communication.

* * * * *